(12) United States Patent
Hunt et al.

(10) Patent No.: US 11,590,647 B2
(45) Date of Patent: Feb. 28, 2023

(54) FOUR-BAR PARALLEL ACTUATED ARCHITECTURE FOR EXOSKELETON

(71) Applicants: Justin Hunt, Tempe, AZ (US); Hyunglae Lee, Phoenix, AZ (US)

(72) Inventors: Justin Hunt, Tempe, AZ (US); Hyunglae Lee, Phoenix, AZ (US)

(73) Assignee: ARIZONA BOARD OF REGENTS ON BEHALF OF ARIZONA STATE UNIVERSITY, Scottsdale, AZ (US)

(*) Notice: Subject to any disclaimer, the term of this patent is extended or adjusted under 35 U.S.C. 154(b) by 827 days.

(21) Appl. No.: 16/387,152

(22) Filed: Apr. 17, 2019

(65) Prior Publication Data

US 2019/0314978 A1 Oct. 17, 2019

Related U.S. Application Data

(60) Provisional application No. 62/658,966, filed on Apr. 17, 2018.

(51) Int. Cl.
| | | |
|---|---|---|
| *A61H 1/02* | (2006.01) | |
| *B25J 9/10* | (2006.01) | |
| *B25J 9/00* | (2006.01) | |
| *F16H 21/54* | (2006.01) | |

(52) U.S. Cl.
CPC .......... *B25J 9/0006* (2013.01); *A61H 1/0281* (2013.01); *B25J 9/1065* (2013.01); *F16H 21/54* (2013.01); *A61H 2201/165* (2013.01); *A61H 2201/1616* (2013.01)

(58) Field of Classification Search
CPC ..... B25J 9/0006; B25J 9/1065; A61H 1/0281; A61H 2201/165; A61H 2201/1616; F16H 21/54
See application file for complete search history.

(56) References Cited

U.S. PATENT DOCUMENTS

| | | | | |
|---|---|---|---|---|
| 4,095,481 A | * | 6/1978 | Kasai | B25J 9/04 901/14 |
| 4,396,344 A | * | 8/1983 | Sugimoto | B25J 9/104 414/706 |
| 6,095,011 A | * | 8/2000 | Brogardh | B25J 9/1065 248/278.1 |
| 2005/0262959 A1 | * | 12/2005 | Angeles | B23Q 1/626 74/490.01 |

(Continued)

FOREIGN PATENT DOCUMENTS

| | | |
|---|---|---|
| WO | 2018022689 A1 | 2/2018 |
| WO | 2018022692 A1 | 2/2018 |

OTHER PUBLICATIONS

Hunt, Justin et al, A Novel Shoulder Exoskeleton Robot Using Parallel Actuation and a Passive Slip Interface, Feb. 2017, vol. 9. (Year: 2017).*

(Continued)

*Primary Examiner* — Timothy A Stanis
(74) *Attorney, Agent, or Firm* — Michael Best & Friedrich LLP

(57) ABSTRACT

An exoskeleton for interfacing with a joint includes a base configured to be coupled to a user, a platform configured to be coupled to the user proximate the joint, and a plurality of substructures extending between the base and the platform. The substructures are actuated in parallel in order to move the platform.

15 Claims, 19 Drawing Sheets

(56) References Cited

U.S. PATENT DOCUMENTS

| | | | | |
|---|---|---|---|---|
| 2010/0113987 | A1* | 5/2010 | Agrawal | B25J 9/104 601/33 |
| 2011/0251533 | A1* | 10/2011 | Han | A63B 69/0059 601/33 |
| 2016/0031079 | A1* | 2/2016 | Meuleman | B25J 9/106 74/47 |
| 2018/0345482 | A1 | 12/2018 | Nalam et al. | |
| 2019/0160653 | A1 | 5/2019 | Artemiadis et al. | |
| 2019/0202560 | A1* | 7/2019 | Bosworth | B25J 15/0213 |
| 2019/0217465 | A1 | 7/2019 | Artemiadis et al. | |

OTHER PUBLICATIONS

Alici et al. "Topology optimisation and singularity analysis of a 3-SPS parallel manipulator with a passive constraining spherical joint", Mechanism and Machine Theory, vol. 39, pp. 215-235, 2004.

Bogue, "Exoskeletons and robotic prosthetics: a review of recent developments", Industrial Robot: An International Journal, vol. 36(5), pp. 421-427, 2009.

Cempini et al., "Self-alignment mechanisms for assistive wearable robots: A kinetostatic compatibility method", IEEE Transactions on Robotics, vol. 29, No. 1, p. 236 250, 2013.

Cyberdyne, <https://www.cyberdyne.jp/english/>, webpage publicly available at least as early as Apr. 28, 2007.

Ekso, "Products—Ekso Bionics" <https://web.archive.org/web/20170211235226/http://eksobionics.com/eksohealth/products/>, website publicly available at least as early as Feb. 11, 2017.

Erwin et al., "Development, Control, and MRI-Compatibility of the MR-SoftWrist", IEEE International Conference on Rehabilition Robotics, pp. 187-192, 2015.

Glosser et al., "The implementation of a natural admittance controller on an industrial manipulator", IEEE International Conference on Robotics and Automation , IEEE Comput. Soc. Press, pp. 1209-1215, 1994.

Gosselin, "Stiffness Mapping for Parallel Manipulators", IEEE Transactions on Robotics and Automation, vol. 6, No. 3, pp. 377-382, 1990.

Gosselin et al., "On the kinematic design of spherical three-degree-of-freedom parallel manipulators", International Journal of Robotics Research, vol. 12, No. 4, pp. 394 402, 1993.

Gupta et al., "Design, control and performance of RiceWrist: A force feedback wrist exoskeleton for rehabilitation and training", International Journal of Robotics Research, pp. 233-251, 2008.

Hogan, "On the Stability of Manipulators Performing Contact Tasks", IEEE Journal on Robotics and Automation, vol. 4 No. 6, pp. 677-686, 1988.

Hunt et al., "A Novel Shoulder Exoskeleton Robot Using Parallel Actuation and a Passive Slip Interface", Journal of Mechanisms and Robotics, vol. 9, pp. 11002-1-7, 2017.

Hunt, "Structural Kinematics of In-Parallel-Actuated Robot-Arms", Journal of Mechanical Design, vol. 105(4): pp. 705-712, 1983.

Husty, "An algorithm for solving the direct kinematics of general Stewart-Gough platforms", Mechanism and Machine Theory, vol. 31(4): pp. 365-380, 1996.

Hyundai, "Hyundai Media Centre", <https://web.archive.org/web/20170527160147/http://www.hyundaipressoffice.co.uk/>, website publicly available at least as early as May 27, 2017.

Joon-Hyuk Park, "Dynamic brace for correction of abnormal postures of the human spine", IEEE International Conference on Robotics and Automation, pp. 5922-5927, 2015.

Kim et al., "Kinematic Synthesis of Spatial 3-RPS Parallel Manipulators", 27th Biennial Mechanisms and Robotics Conference, vol. 5, pp. 873-880, 2002.

Kong et al., "Type Synthesis of 3-DOF Spherical Parallel Manipulators Based on Screw Theory", Journal of Mechanical Design, vol. 126, pp. 101-108, 2004.

Kong et al., "Type Synthesis of 3-DOF Translational Parallel Manipulators Based on Screw Theory", Journal of Mechanical Design, vol. 126, pp. 83-92, 2004.

Lee, "Dynamic analysis of a three-degrees-of-freedom in parallel actuated manipulator", IEEE Journal on Robotics and Automation, vol. 4(3), pp. 361-367, 1988.

Lee et al., "Multivariable static ankle mechanical impedance with relaxed muscles", Journal of Biomechanics, vol. 44 (10), pp. 1901-1908, 2011.

Liu et al., "Optimum design of 3-DOF spherical parallel manipulators with respect to the conditioning and stiffness indices", Mechanism and Machine Theory, vol. 35(9), pp. 1257-1267, 2000.

Merlet, "Jacobian, Manipulability, Condition Number, and Accuracy of Parallel Robots", Journal of Mechanical Design, vol. 128(1), pp. 199-206, 2006.

Pashkevich et al., "Stiffness analysis of overconstrained parallel manipulators", Mechanism and Machine Theory, Pergamon 44(5): pp. 966-982, 2009.

Pehlivan et al., "Design and validation of the RiceWrist-S exoskeleton for robotic rehabilitation after incomplete spinal cord injury", Robotica, 32(8): pp. 1415-1431, 2014.

Roy et al., "Robot-Aided Neurorehabilitation: A Novel Robot for Ankle Rehabilitation", IEEE Trans Robotics 25(3): pp. 569-582, 2009.

Sarcos Robotics, <https://www.sarcos.com>, webpage publicly available at least as early as Jan. 3, 2017.

Schiele et al., "Kinematic design to improve ergonomics in human machine interaction", IEEE Transactions on Neural Systems and Rehabilitation Engineering 14(4): pp. 456-469, 2006.

Stienen et al., "Self-aligning exoskeleton axes through decoupling of joint rotationsand translations", IEEE Transactions on Robotics 25(3): pp. 628-633, 2009.

Toxiri et al., "Assistive strategies for a backsupport exoskeleton: Experimental evaluation", Mechanisms and Machine Science, Springer, Cham, pp. 805-812, 2018.

Tsai et al., "Kinematics and Optimization of a Spatial 3-UPU Parallel Manipulator", Journal of Mechanical Design, American Society of Mechanical Engineers vol. 122, pp. 439-446, 2000.

Walter et al., "A Complete Kinematic Analysis of the SNU 3-UPU Parallel Robot", Contemporary Mathematics 0: pp. 1-16, 2000.

Wu et al., "A comparison study on the dynamics of planar 3-DOF 4-RRR, 3-RRR and 2-RRR parallel manipulators", Robotics and Computer-Integrated Manufacturing, Pergamon 27(1): pp. 150-156.

Young et al., "State of the art and future directions for lower limb robotic exoskeletons", IEEE Transactions on Neural Systems and Rehabilitation Engineering 25(2): pp. 171-182, 2017.

* cited by examiner

FOUR-BAR PARALLEL ACTUATED ARCHITECTURE FOR EXOSKELETON

CROSS-REFERENCE TO RELATED APPLICATION

This application claims the benefit of U.S. Provisional Patent Application No. 62/658,966, filed Apr. 17, 2018, the entire contents of which are incorporated by reference herein.

FIELD OF THE DISCLOSURE

The present disclosure relates to an exoskeleton architecture with a spherical workspace and, more specifically, to a parallel actuated exoskeleton.

BACKGROUND

The majority of exoskeleton robotic devices utilize a serial chain architecture of actuated joints and linkages to accomplish a desired task. This model can work for simple one degree-of-freedom (DoF) joints like the elbow and knee, but it is less effective for ball and socket joints like the shoulder, hip, wrist, and ankle, because unlike one DoF biological joints that can share an axis of rotation with a corresponding artificial joint, ball and socket joints operate about a center of rotation that cannot be shared in an anatomically similar manner.

The most common solution to augment the motion of a ball and socket joint with serial actuation is to use a multiple linkage robotic armature that works to bridge the ball and socket joint by connecting the structures on either side. The moment arm associated with these linkages has the inherent disadvantage of amplifying torques applied to the joint by external forces. Furthermore, each motorized joint in the armature must be capable of not only actuating the corresponding human limb, but also able to lift and manipulate the joints that follow in series. This requires larger motors that consume more energy.

SUMMARY

One embodiment provides an exoskeleton for interfacing with a joint that includes a base to be coupled to a user, a platform to be coupled to the user proximate the joint, and a plurality of substructures extending between the base and the platform. The substructures are actuated in parallel in order to move the platform.

Another embodiment provides an exoskeleton for interacting with a ball and socket joint that includes a base to couple to a user, and a platform to be coupled to the user. The platform moves in a spherical workspace. The exoskeleton also includes a plurality of substructures connecting the base to the platform. The substructures are actuated in parallel to move the platform.

A further embodiment provides an exoskeleton of a ball and socket joint that includes a base to be coupled to a user. A platform is coupled to the user proximate the joint. A first substructure connects the base to the platform, a second substructure connects the base to the platform, and a third substructure connects the base to the platform. The second substructure is spaced apart from the first substructure, and the third substructure is spaced apart from the first and second substructures. The substructures are actuated in parallel in order to move the platform about a spherical workspace.

Other aspects of the invention will become apparent by consideration of the detailed description and accompanying drawings.

DETAILED DESCRIPTION

Before any embodiments are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

In general, the present disclosure relates to actuated four-bar mechanisms that are positioned around a human joint and work synergistically to manipulate the joint appendage. The actuated four-bar mechanisms can specifically be used to augment human spherical joints, like the ankle, hip, wrist, and shoulder.

Figure 1:
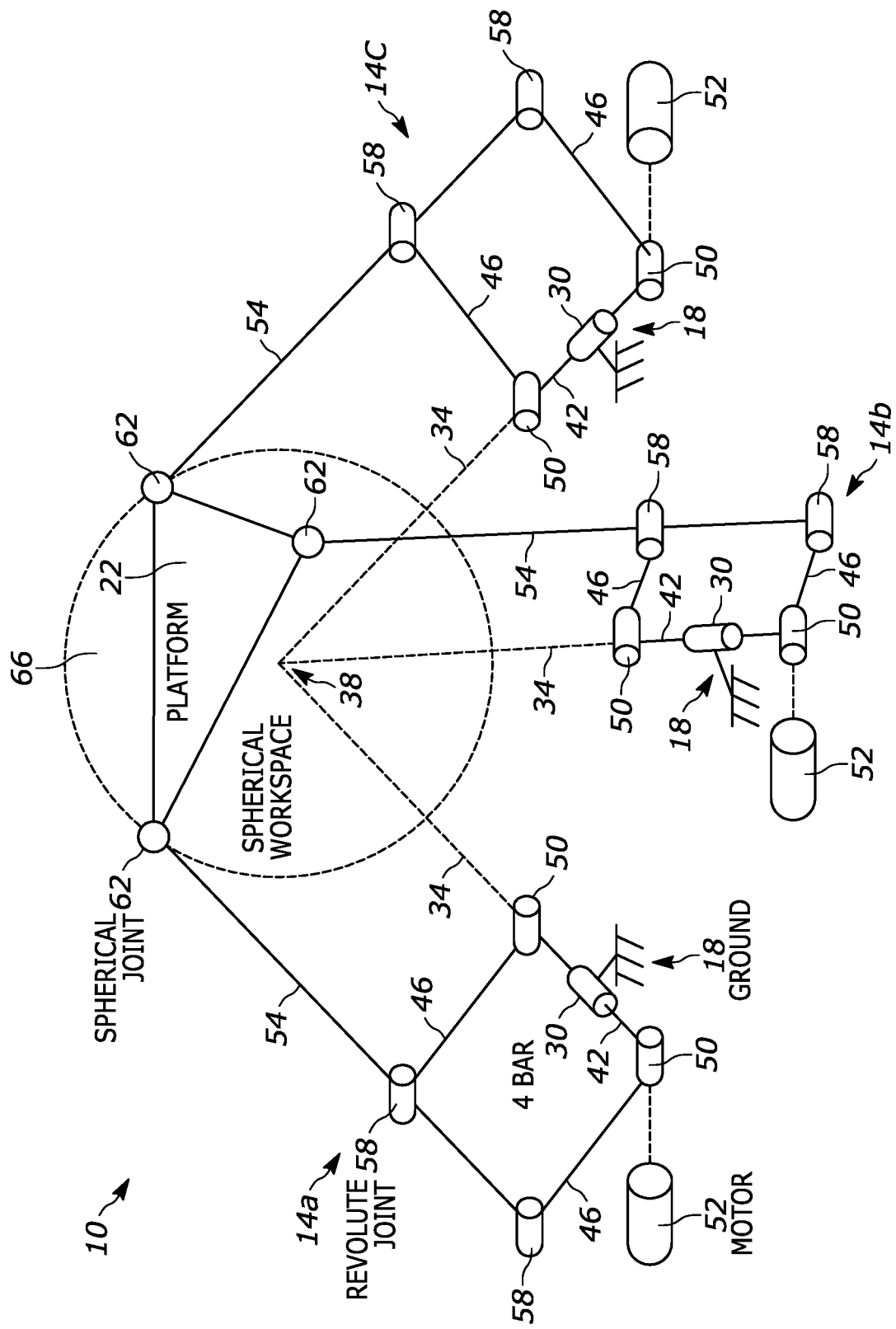
FIG. 1 is a schematic diagram of four-bar spherical parallel manipulators.
Figure 2:
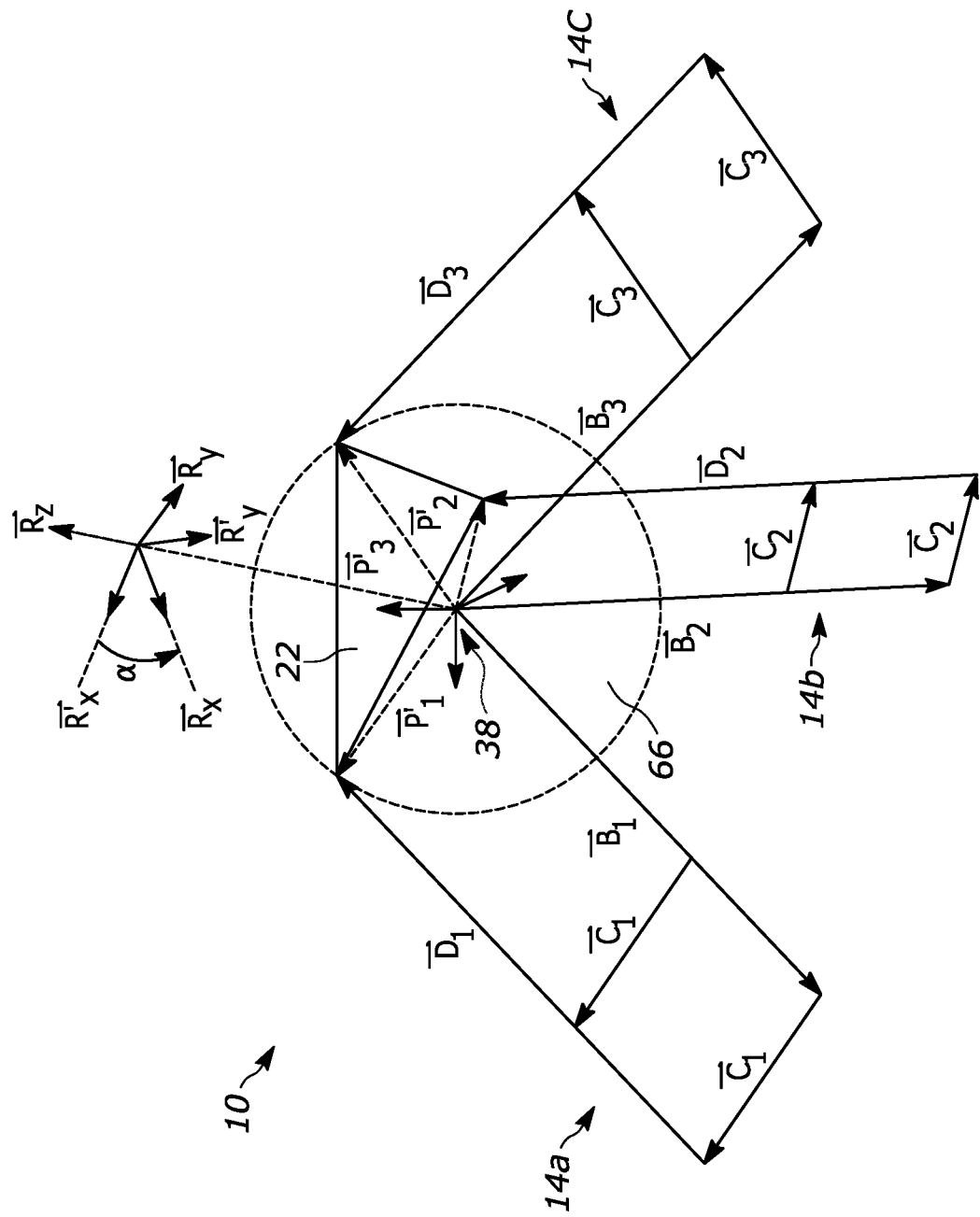
FIG. 2 is a vector representation of the four-bar spherical parallel manipulators of FIG. 1.

As shown in FIGS. 1 and 2, the architecture of an exoskeleton or a four-bar spherical parallel manipulator (4B-SPM) 10 includes three actuated substructures 14a, 14b, 14c that couple a stationary base 18 to a mobile platform 22. Each substructure 14a-14c includes a four-bar mechanism connected to a grounded revolute joint 30 at the base 18. Axes 34 of the grounded joints 30 intersect at a desired point in space 38. The point 38 represents the center of rotation of the mobile platform 22.

The four-bar mechanism of each substructure 14a-14c includes a base link 42 represented by the rotation axis 34, two parallel links 46 of (e.g., of equal length) connected at each end of the base link 42 using one degree of freedom rotational joints 50 and a top linkage 54 connected to the two parallel links 46 using one degree of freedom rotational joints 58 as well. One end of each top linkage 54 is extended outward and is coupled to the mobile platform 22 using a three degree of freedom spherical joint 62. Since there is an axis of rotation at the base of each four-bar mechanism, the resulting end effector motion of each substructure 14a-14c can be considered spherical in three-dimensional space. By aligning this spherical motion about the point in which each substructure rotation axis intersects, it is possible to have all three substructures 14a-14c generating spherical motion about the same size spherical workspace 66. This allows the three substructures 14a-14c to manipulate the position of the mobile platform 22 about this spherical workspace 66, as the substructures move together (i.e., in parallel).

Additional sensors may be integrated into each four-bar substructure 14a-14c so that the roll, in addition to the pitch, can be directly measured. By knowing the roll and pitch of each substructure 14, the corresponding end points (i.e., platform mounts 62) can be determined.

Figure 3:
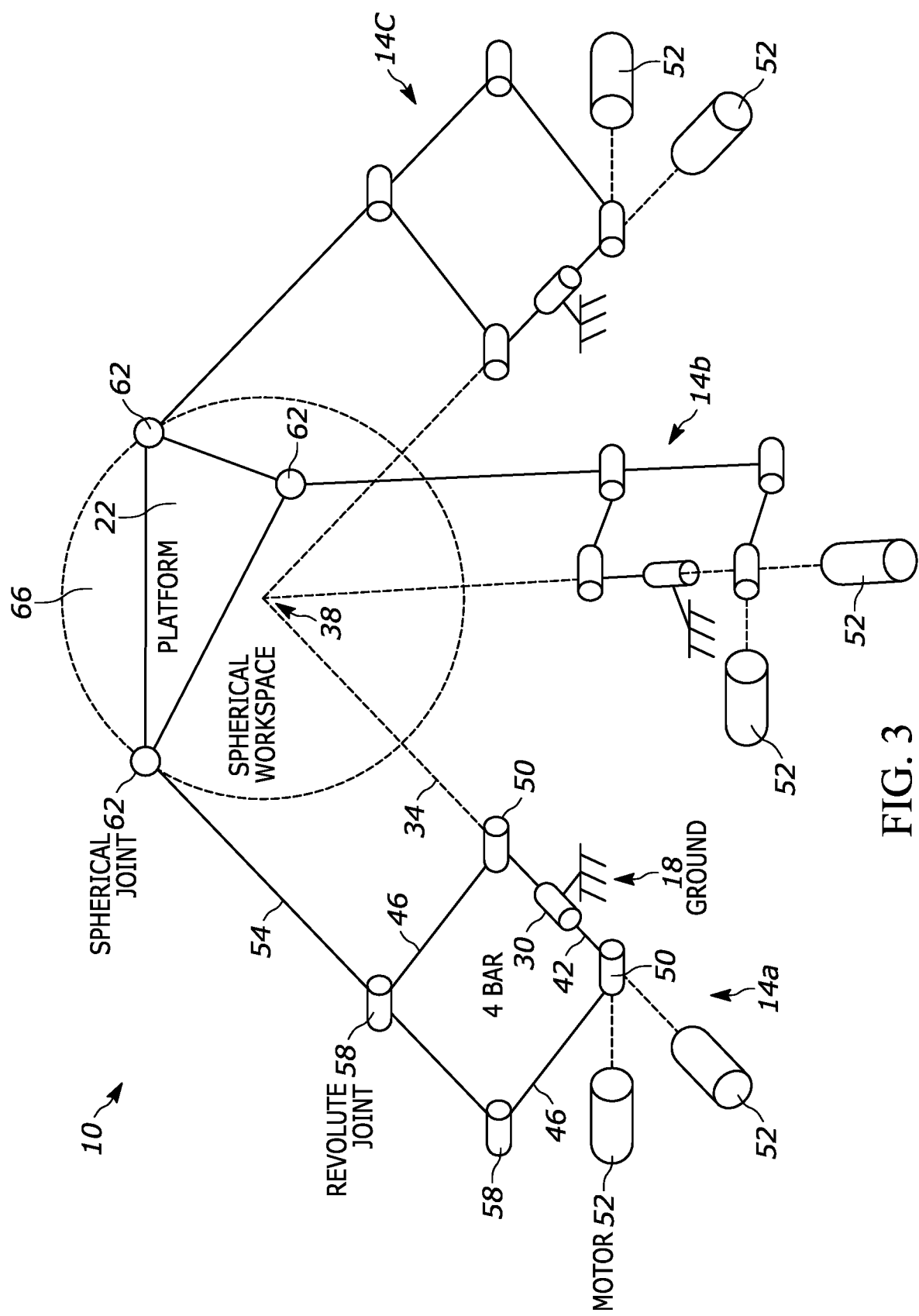
FIG. 3 is a schematic diagram of the four-bar spherical parallel manipulators of FIG. 1, including roll actuation motors.

As shown in FIG. 3, one method of actuating the 4B-SPM 10 is to rotate the substructures 14a-14c (e.g., at one of the joints 50 of each substructure 14a-14c) with motors 52. For example, as illustrated in FIG. 3, two motors 52 may be used at each substructure 14a-c to control pitch and roll. Both the pitch angle and the roll angle of the 4B-SPM 10 are thereby directly controlled. Since the 4B-SPM 10 has only three substructures 14a-14c, it encounters less mechanical interference between substructures 14a-14c and therefore affords a larger spherical workspace 66, as compared to an exoskeleton with six substructures 14. In other embodiments, and as illustrated in FIG. 1, a single motor 52 may be used at each substructure 14a-c.

Figure 4:
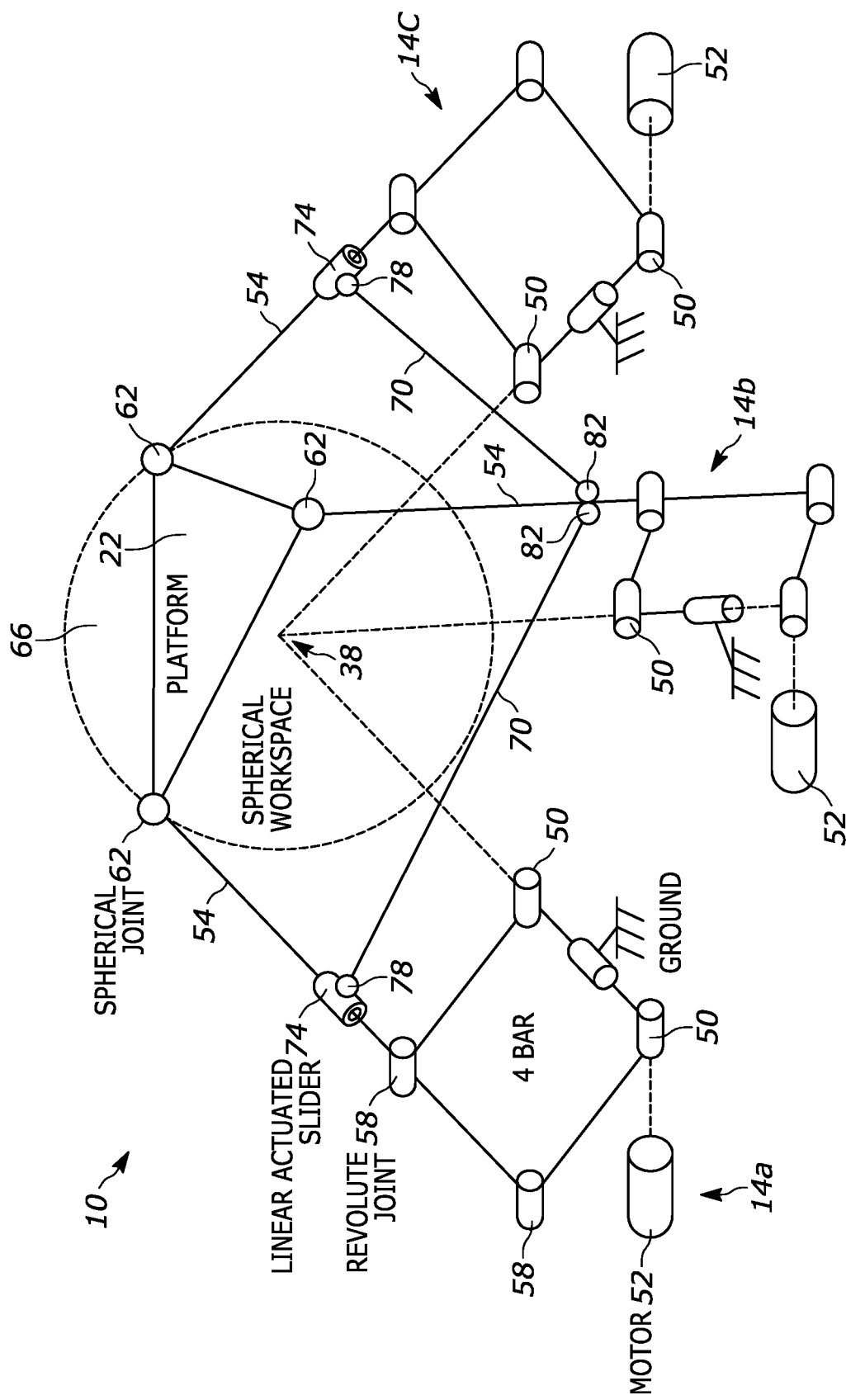
FIG. 4 is a schematic diagram of the four-bar spherical parallel manipulators of FIG. 1, including linear actuated sliders.
Figure 5:
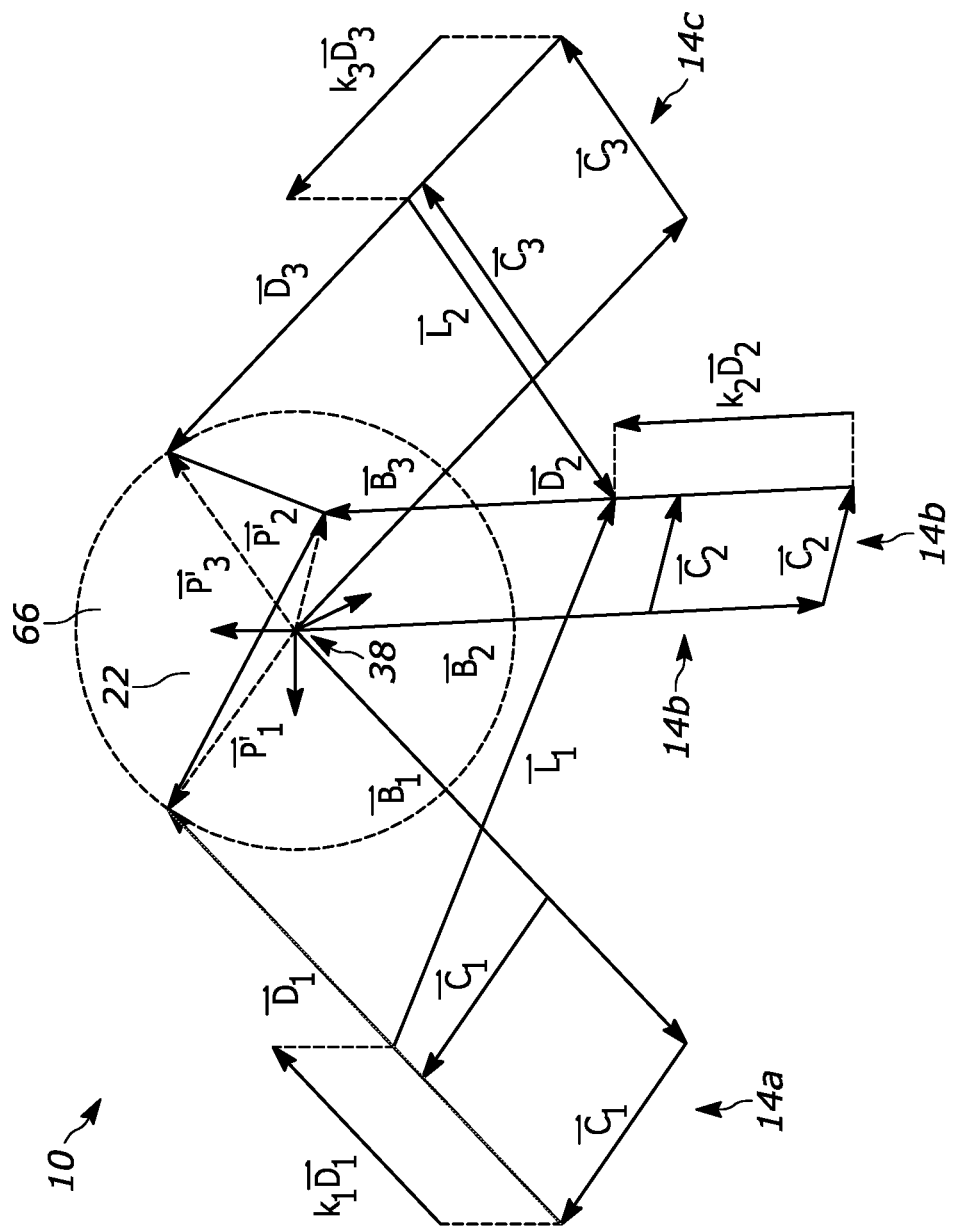
FIG. 5 is a vector diagram of the four-bar spherical parallel manipulators of FIG. 4.

As shown in FIGS. 4 and 5, another method of actuating the 4B-SPM 10 is to include linkages 70 between substructures 14a, 14b and 14b, 14c. Each linkage 70 is coupled to a motorized slider 74 mounted on one of the two corresponding substructures 14a-14c. In the illustrated embodiment, a motorized slider 74 is coupled to the top linkage 54 of the first and third substructures 14a, 14c with a three degree of freedom spherical joint 78. Another end of each linkage 70 is coupled to the top linkage 54 of the second substructure 14b with a three degree of freedom spherical joint 82. Utilizing the linkages 70 only requires two additional motors 74 instead of three, as required in the first method (see e.g., FIG. 3). Additionally, because the linkage 70 is mounted away from the roll axis of each substructure 14a-14c, it helps to further reduce deflection of the substructures 14a-14c.

Figure 6A:
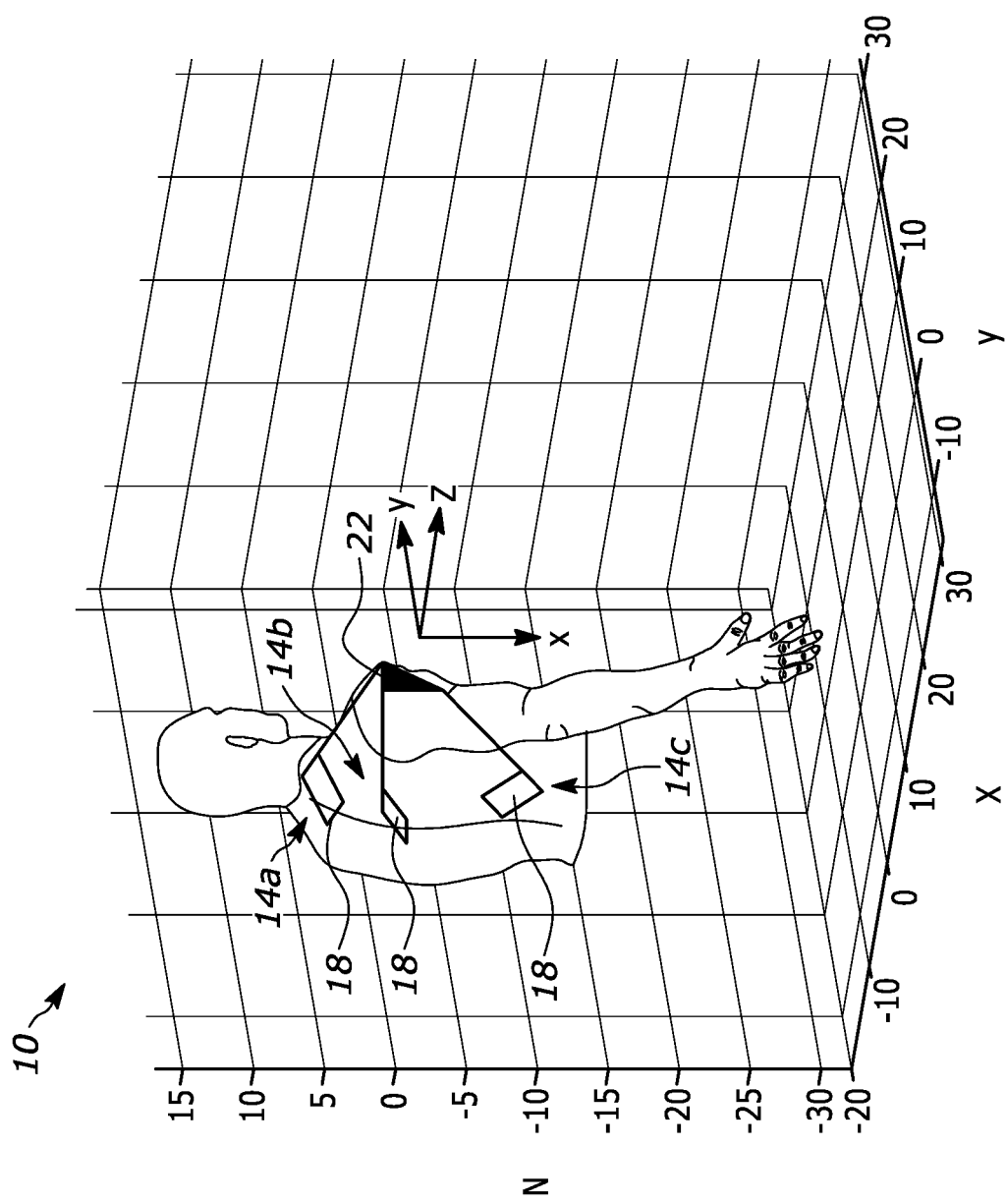
FIG. 6a is a schematic view of the four-bar spherical parallel manipulators of FIG. 1, coupled to a user's shoulder in a resting position.
Figure 6B:
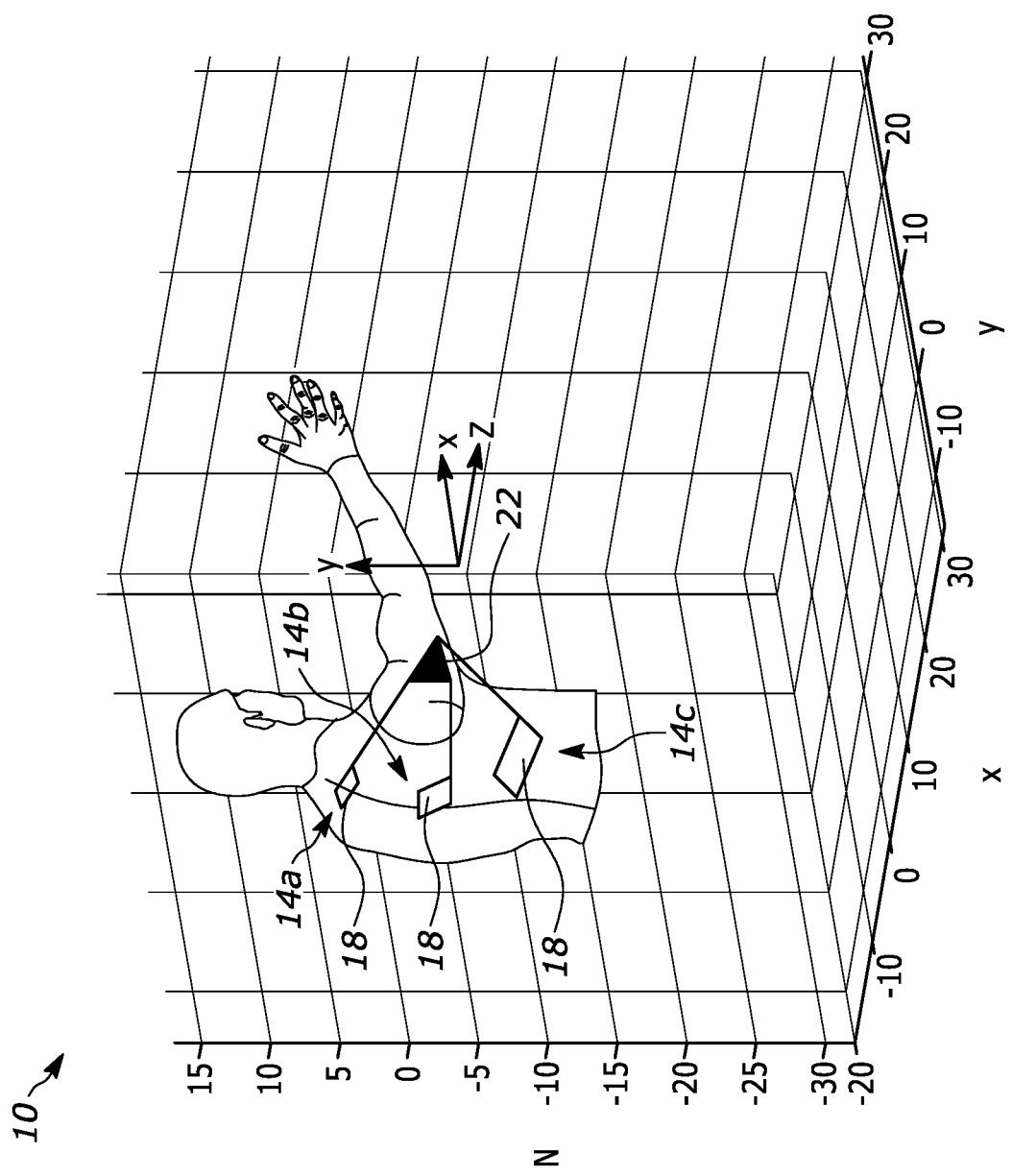
FIG. 6b is a schematic view of the four-bar spherical parallel manipulators of FIG. 1, coupled to a user's shoulder in a 90° flexion position.
Figure 6C:
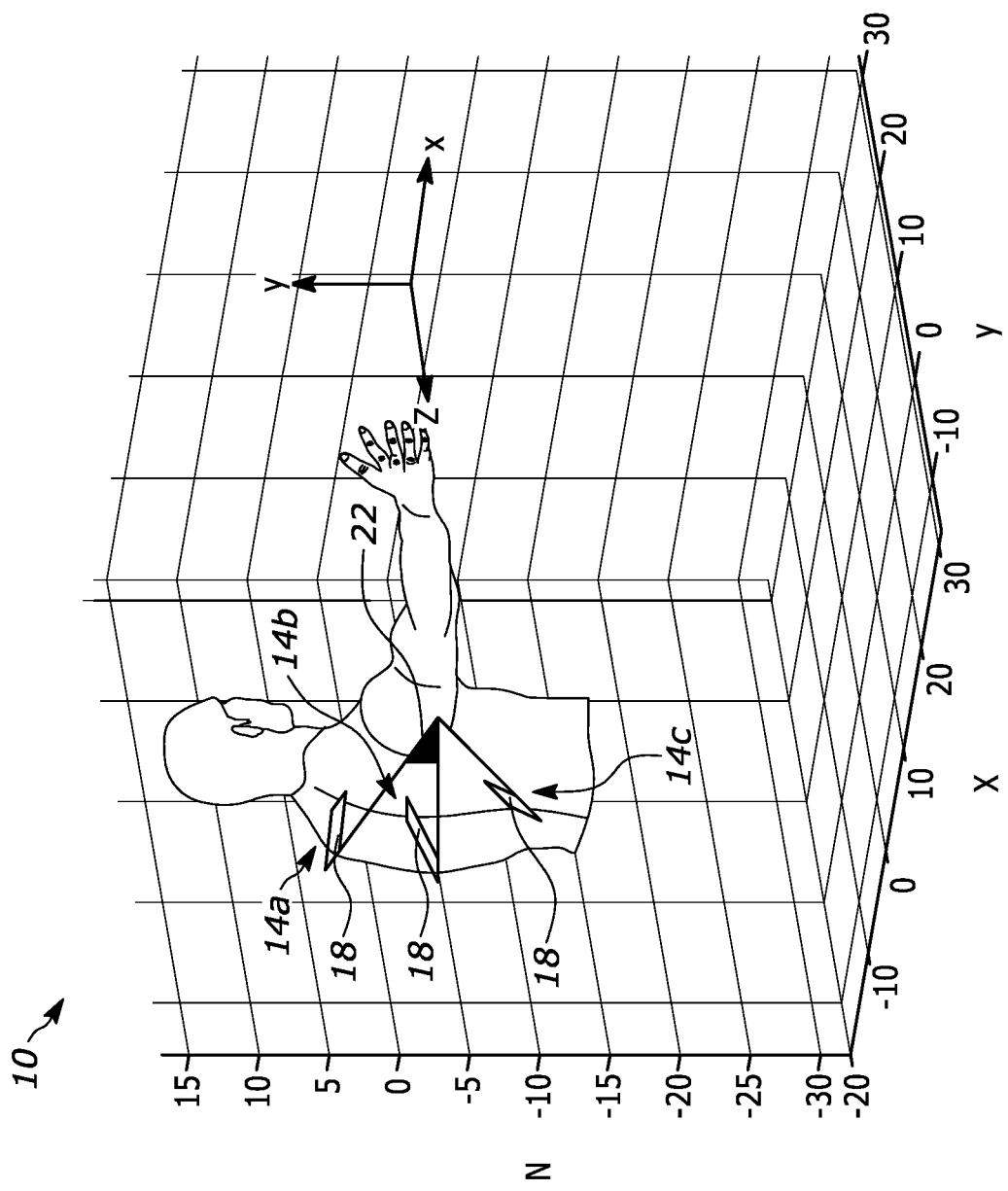
FIG. 6c is a schematic view of the four-bar spherical parallel manipulators of FIG. 1, coupled to a user's shoulder in a 90° abduction position.

In order to improve the practical workspace 66, to more closely match that of a highly flexible joint, such as the shoulder or hip, a cooperative control technique may be used. The cooperative control technique involves allocating one of the three DoF of the 4B-SPM 10 to a robot controller (not shown). The robot controller can determine the solution to this DoF so as to keep the 4B-SPM 10 within its workspace 66 while still following the two-DoF commands sent by the operator. In the illustrated embodiment, an operator would control the inclination and azimuth of the operator's arm, while the robot controller would control the roll of the shoulder plate (i.e., mobile platform 22) in order to keep the 4B-SPM 10 from hitting a mechanical limit (see e.g., FIGS. 6a-6c). Allowing the robot controller to control of the shoulder plate 22 roll limits the operator's ability to reach a desired position with a particular roll orientation of the arm. Therefore, for the 4B-SPM 10 to remain effective, a one-DoF revolute joint interface 86 (see e.g., FIG. 11) between the human operator and the 4B-SPM may be added. This joint 86 could be passive or active depending on the application.

FIGS. 7a-10d show arrangements of both the base mounts 18 and the platform mounts 22. Each arrangement demonstrates one possible configuration of the 4B-SPM 10. The configurations shown interface with the anatomy of the corresponding joint while still reaching the desired workspace 66.

FIGS. 7a-7d show possible arrangements for the 4B-SPM 10 positioned adjacent a user's ankle. In the illustrated embodiment, the ankle's range of motion has bounds of 45° plantar flexion (i.e., a top of a foot pointed away from a leg), 15° dorsiflexion (i.e., toes of the foot brought toward the shin), 20° inversion (i.e., turning a bottom of one foot toward the other foot), 20° eversion (i.e., turning the bottom of one foot away from the other foot), 20° pronation (i.e., turning toes away from other foot), and 20° supination (i.e., turning toes toward other foot). These bounds match accumulative average ranges of motion, but could be changed to other values if needed. The base mounts 18 are positioned about the tibia bone and the mobile platform 22 mounts are positioned atop the front and back of the foot. In some embodiments, the mobile platform 22 may be taken as a shoe and the stationary base 18 as either part of a greater exoskeleton or a knee orthosis brace (not shown).

Figure 7B:
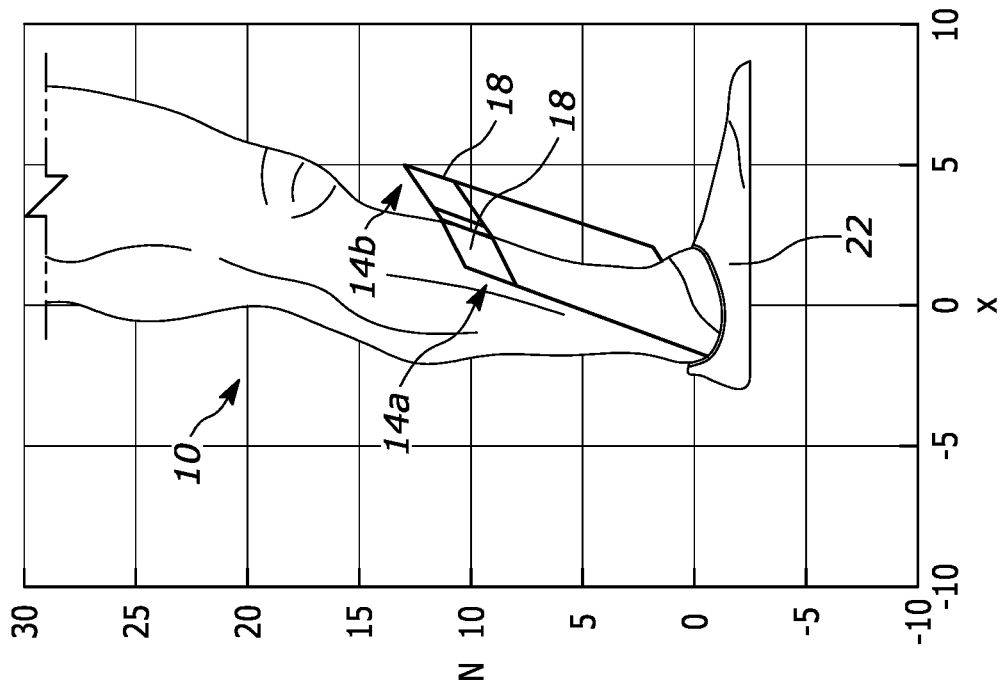
FIG. 7b is a side schematic view of the four-bar spherical parallel manipulators of FIG. 1, coupled to a user's ankle.
Figure 7A:
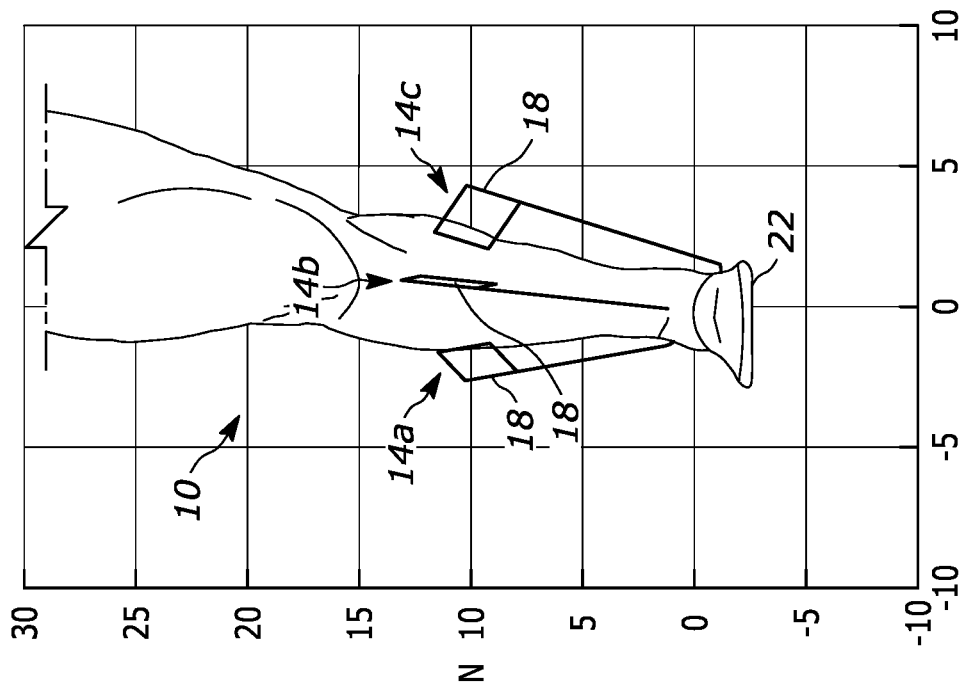
FIG. 7a is a front schematic view of the four-bar spherical parallel manipulators of FIG. 1, coupled to a user's ankle.
Figure 7C:
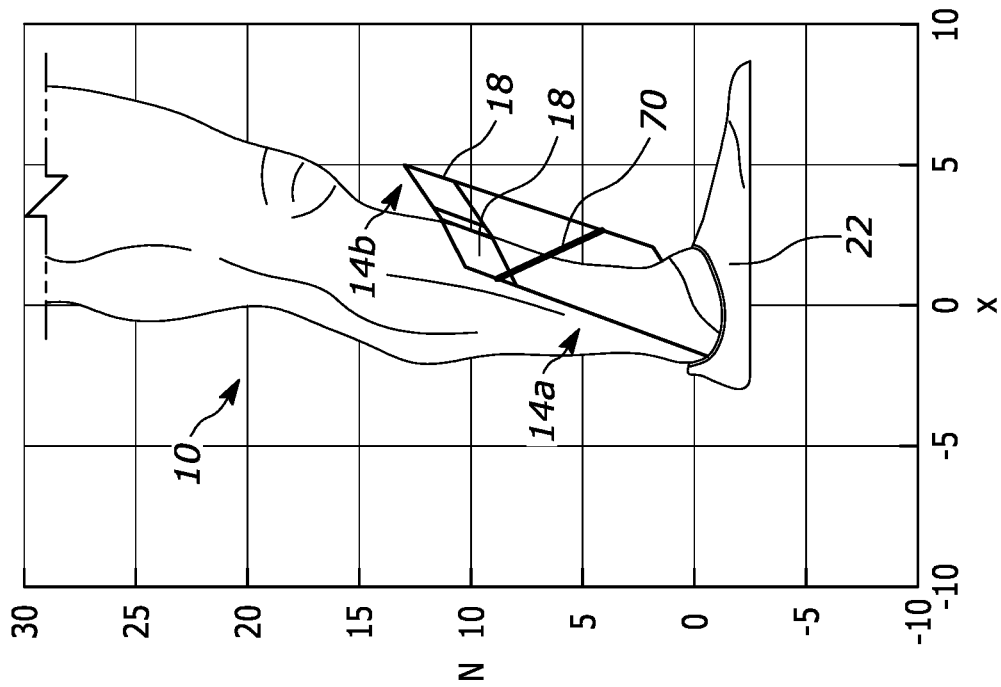
FIG. 7c is a front schematic view of the four-bar spherical parallel manipulators of FIG. 4, coupled to a user's ankle.
Figure 7D:
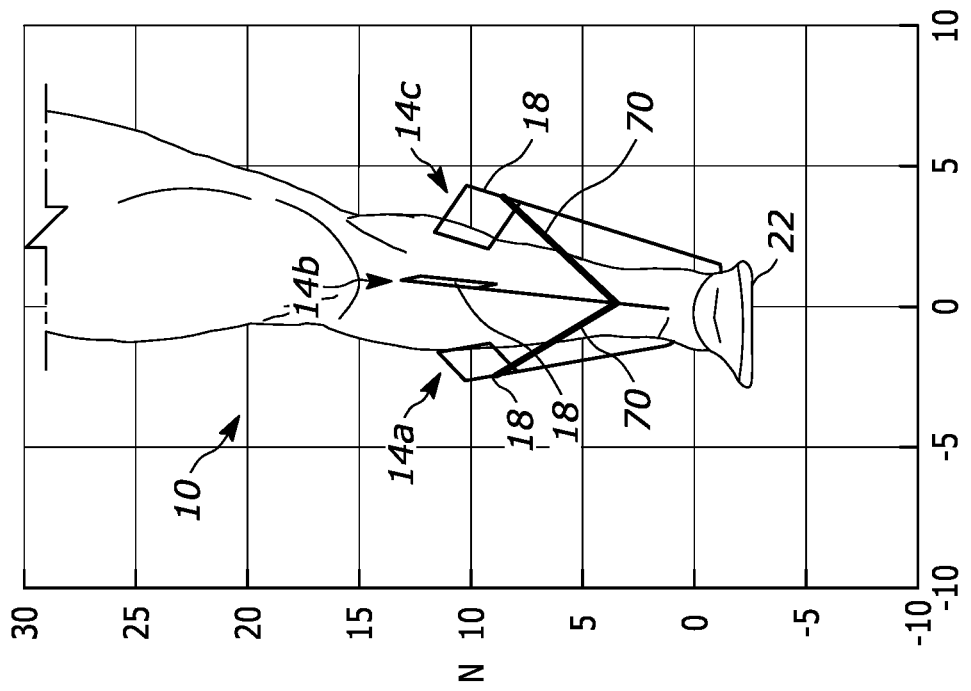
FIG. 7d is a side schematic view of the four-bar spherical parallel manipulators of FIG. 4, coupled to a user's ankle.

FIGS. 7c-7d show an embodiment of the 4B-SPM 10 that includes the linkages 70. The linkages 70 may move along the outermost substructures positioned on the sides of the leg (e.g., the first substructure 14a and the third substructure 14c), for example via linear actuated sliders like the sliders 74 described above. In the illustrated embodiment, the linkages 70 are coupled to the second substructure 14b, positioned on a front of the leg between the outermost substructures 14a, 14c. The linkages 70 are also coupled generally at the same point on the second substructure 14b, for example via a spherical joint or joints such as joints 82 described above.

FIGS. 8a-8d show possible arrangements for the 4B-SPM 10 positioned adjacent a user's wrist. In the illustrated embodiment, the wrist's range of motion is shown with bounds of 65° flexion (i.e., pivoting a hand toward bottom of an arm), 65° extension (i.e., pivoting the hand toward top of the arm), 75° pronation (i.e., pivoting the wrist so that knuckles are facing up), 75° supination (i.e., pivoting the wrist so that palm is facing up), 20° ulnar deviation (i.e., pivoting the hand toward outer surface of the arm), and 20° radial deviation (i.e., pivoting the hand toward inner surface of the arm). These bounds match accumulative average ranges of motion, but could be changed to other values if needed. The base mounts 18 are positioned about the forearm and the mobile platform 22 mounts are positioned on the back of the hand opposite the palm. In some embodiments, the mobile platform 22 could be taken as a partially rigid glove and the stationary base 18 as either part of a greater exoskeleton or an elbow orthosis brace (not shown).

Figure 8B:
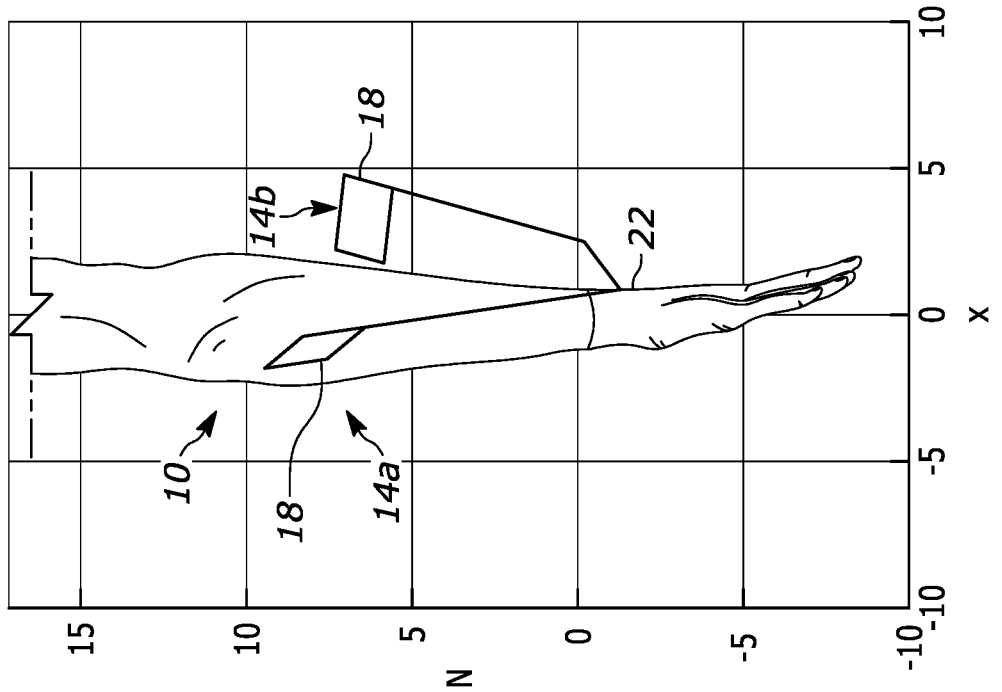
FIG. 8b is a side schematic view of the four-bar spherical parallel manipulators of FIG. 1, coupled to a user's wrist.
Figure 8A:
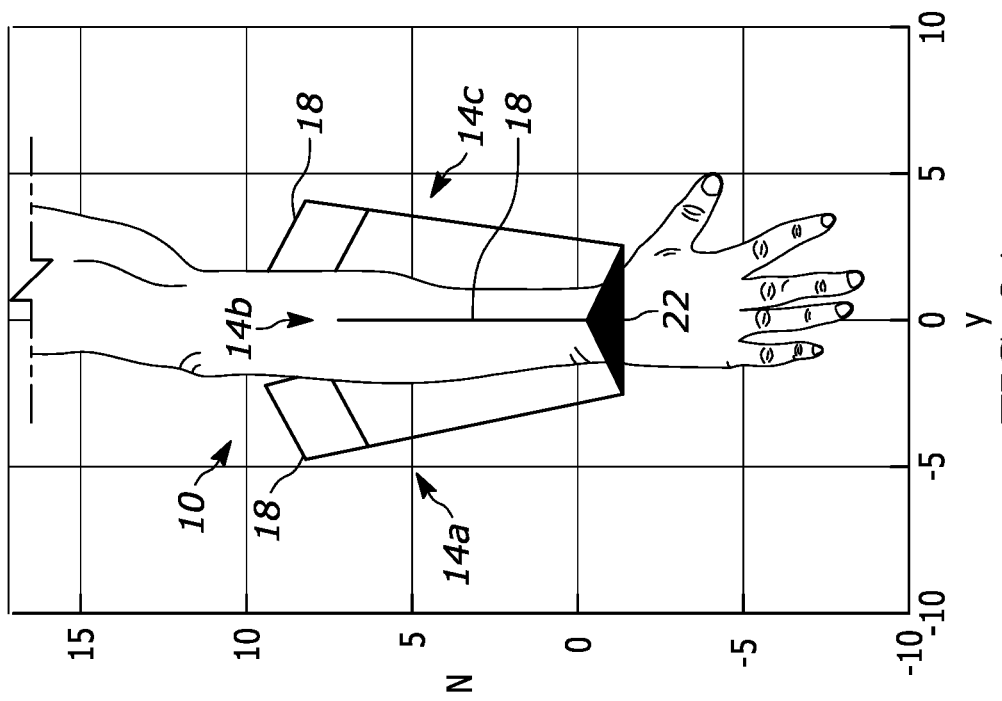
FIG. 8a is a front schematic view of the four-bar spherical parallel manipulators of FIG. 1, coupled to a user's wrist.
Figure 8D:
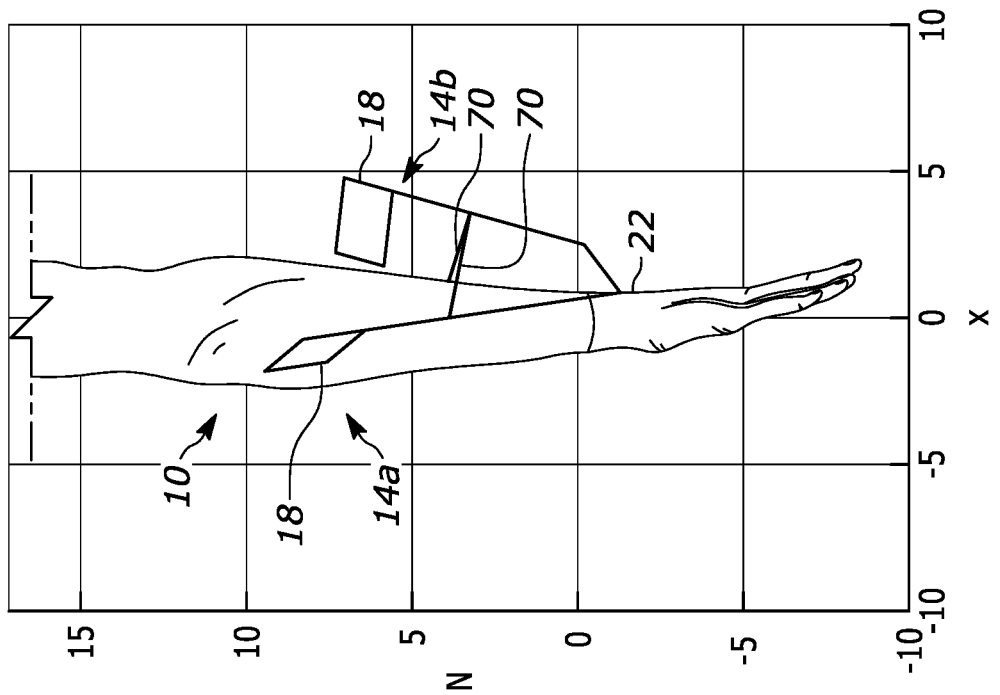
FIG. 8d is a side schematic view of the four-bar spherical parallel manipulators of FIG. 4, coupled to a user's wrist.
Figure 8C:
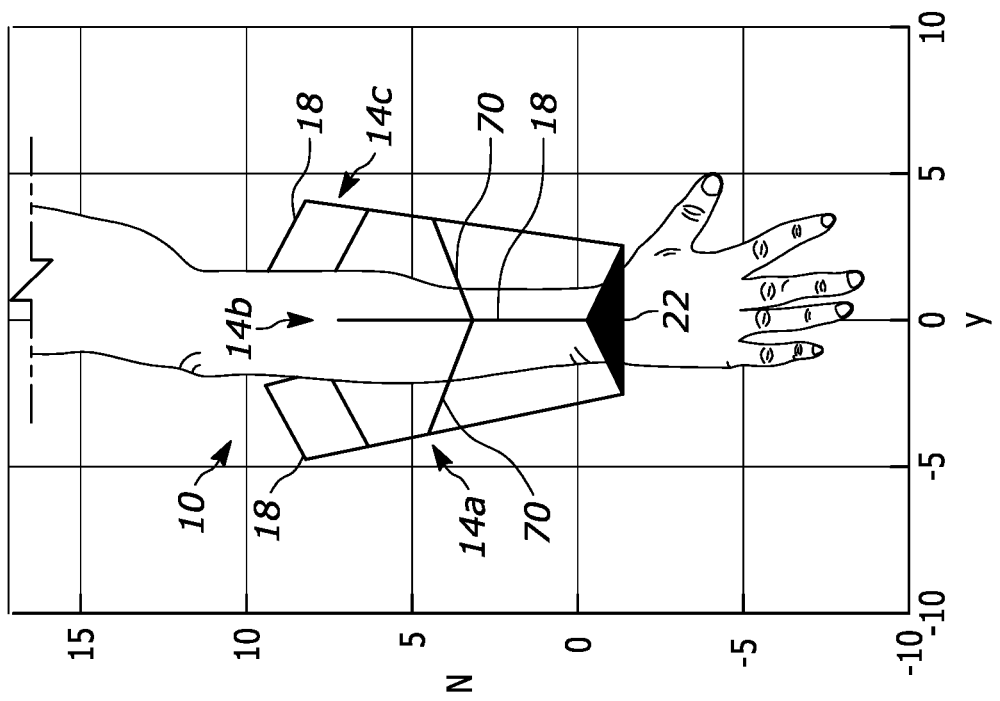
FIG. 8c is a front schematic view of the four-bar spherical parallel manipulators of FIG. 4, coupled to a user's wrist.

FIGS. 8c-8d show an embodiment of the 4B-SPM 10 that includes the linkages 70. The linkages 70 may move along the outermost substructures positioned on the sides of the arm (e.g., the first substructure 14a and the third substructure 14c), for example via linearly actuated sliders like the sliders 74 described above. In the illustrated embodiment, the linkages 70 are coupled to the second substructure 14b, positioned on a front of the arm between the outermost substructures 14a, 14c. The linkages 70 are also coupled generally at the same point on the second substructure 14b, for example via a spherical joint or joints such as joints 82 described above.

FIGS. 9a-9d show possible arrangements for the 4B-SPM 10 positioned adjacent a user's hip. In the illustrated embodiment, the hip's range of motion is bounded by the three operator arm configurations of 90° flexion (i.e., pivoting a leg toward the chest), 30° abduction (i.e., pivoting a leg away from the other leg), and at rest (i.e., the leg aligned with the rest of the body). These bounds match accumulative average ranges of motion, but could be changed to other values if needed. In this configuration, the base mounts 18 are positioned about the waist and the mobile platform 22 mounts are positioned about the femur. In some embodiments, the mobile platform 22 could be taken as a cuff about the upper leg and the stationary base 18 as either part of a greater exoskeleton or a partially rigid vest (not shown).

Figure 9B:
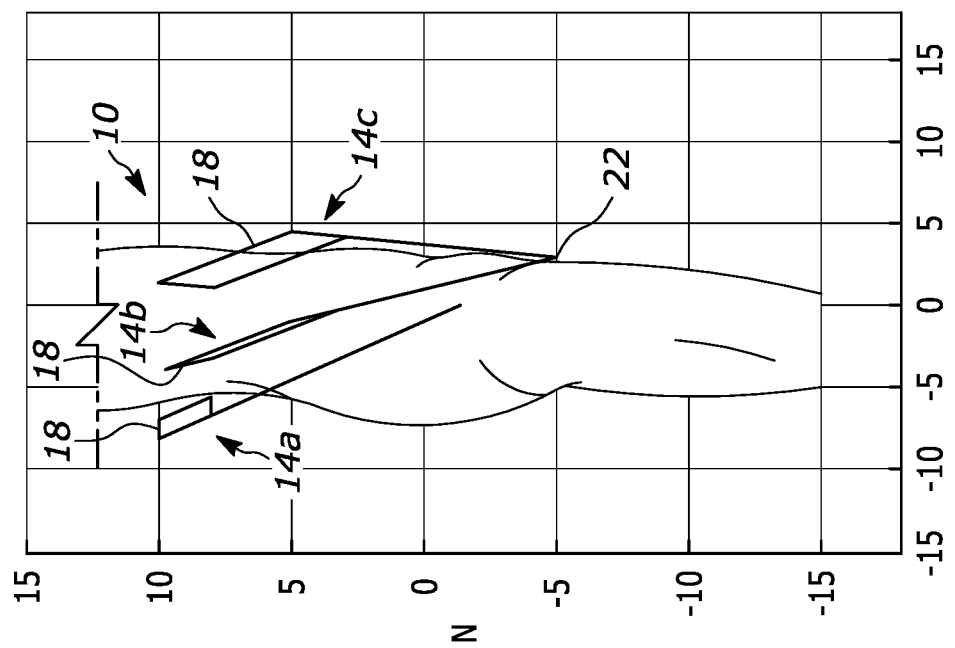
FIG. 9b is a side schematic view of the four-bar spherical parallel manipulators of FIG. 1, coupled to a user's hip.
Figure 9A:
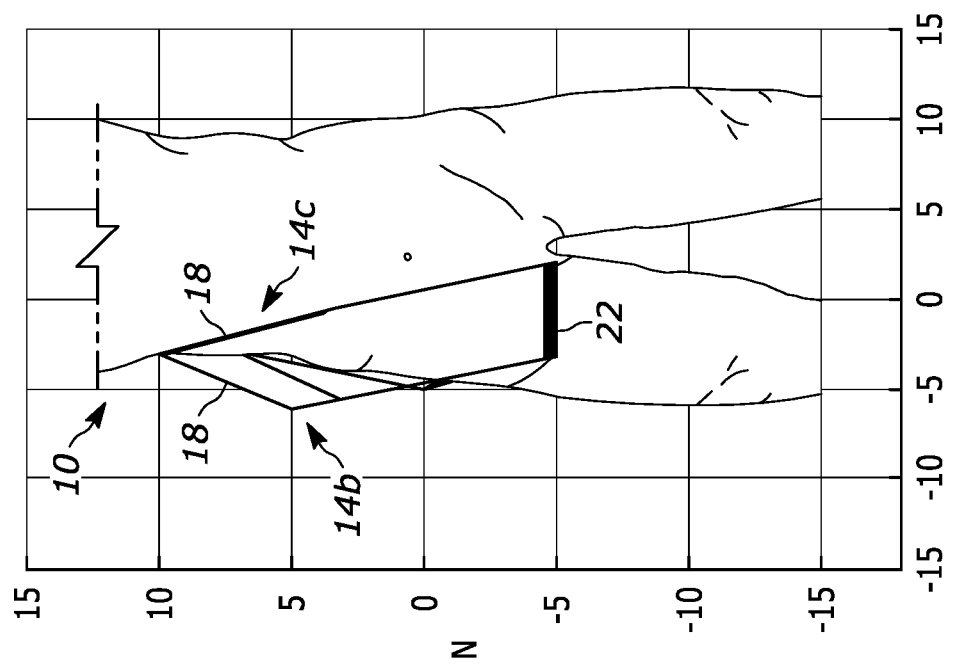
FIG. 9a is a front schematic view of the four-bar spherical parallel manipulators of FIG. 1, coupled to a user's hip.
Figure 9D:
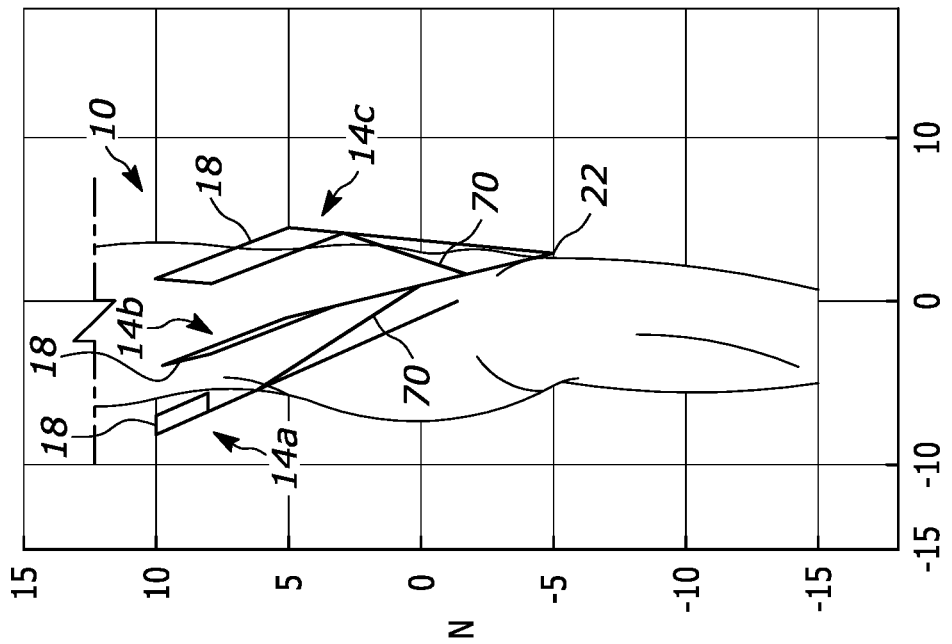
FIG. 9d is a side schematic view of the four-bar spherical parallel manipulators of FIG. 4, coupled to a user's hip.
Figure 9C:
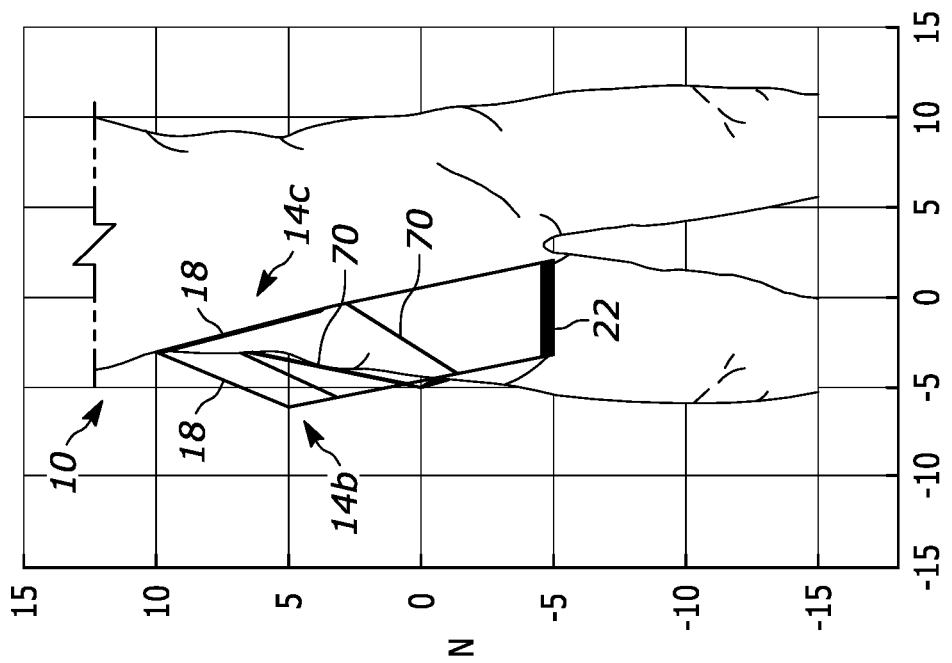
FIG. 9c is a front schematic view of the four-bar spherical parallel manipulators of FIG. 4, coupled to a user's hip.

FIGS. 9c-9d show an embodiment of the 4B-SPM 10 that includes the linkages 70. The linkages 70 may move along the outermost substructures positioned proximate the front and back of the upper leg (e.g., the first substructure 14a and the third substructure 14c), for example via linearly actuated sliders like sliders 74 described above. In the illustrated embodiment, the linkages 70 are coupled to the second substructure 14b, positioned along the side of the leg proximate the hip and between the outermost substructures 14a, 14c. The linkages 70 are coupled at different points on the second substructure 14b, for example via spherical joints such as joints 82 described above.

FIGS. 10a-10d show possible arrangements for the 4B-SPM 10 positioned adjacent a user's shoulder. In the illustrated embodiment, the shoulder's range of motion is bounded by the three operator arm configurations of 90° flexion (i.e., pivoting the arm in front of the body), 90° abduction (i.e., pivoting the arm away from the body), and at rest (i.e., at a user's side). The range of motion of a human shoulder may exceed these bounds, and the range of motion of the 4B-SPM 10 could be increased by utilizing bounded nonlinear multi-objective optimization to configure the parallel substructures so as to maximize the workspace 66. In this configuration, the base mounts 18 are positioned behind the operator and the mobile platform 22 mounts are positioned on a shoulder plate. In some embodiments, the stationary base 18 could be taken as either part of a greater exoskeleton or an electric wheel chair (not shown).

Figure 10B:
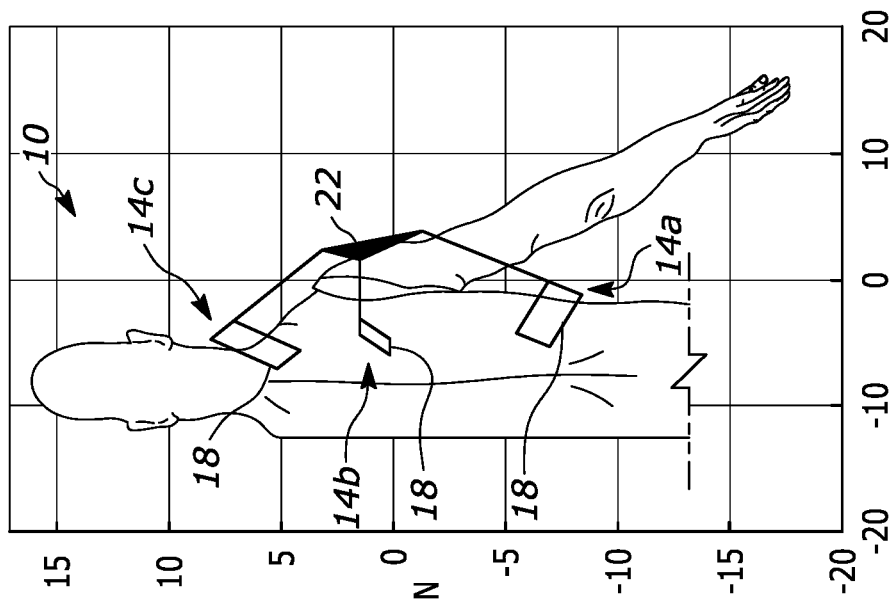
FIG. 10b is a back schematic view of the four-bar spherical parallel manipulators of FIG. 1, coupled to a user's shoulder.
Figure 10A:
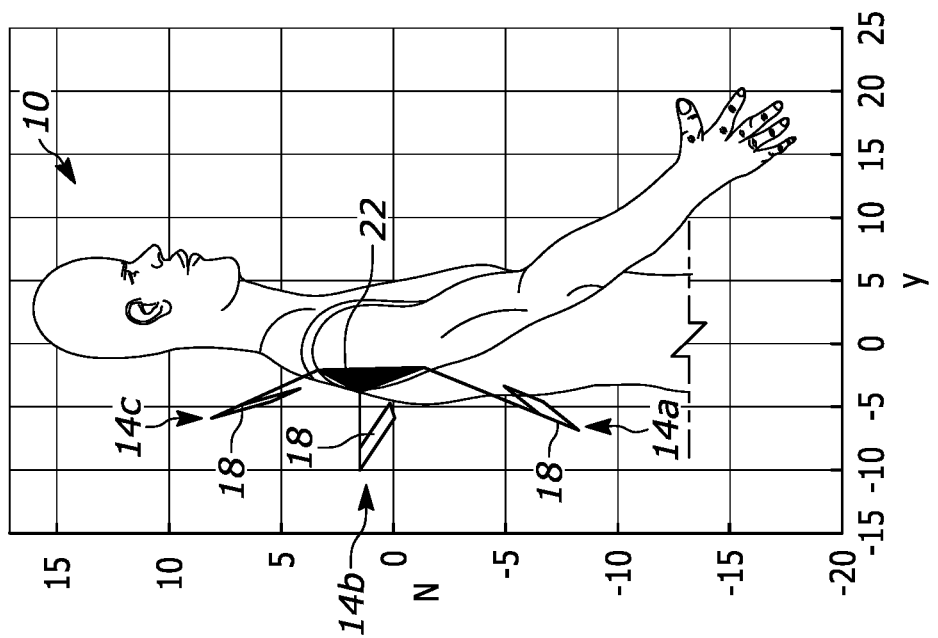
FIG. 10a is a side schematic view of the four-bar spherical parallel manipulators of FIG. 1, coupled to a user's shoulder.
Figure 10D:
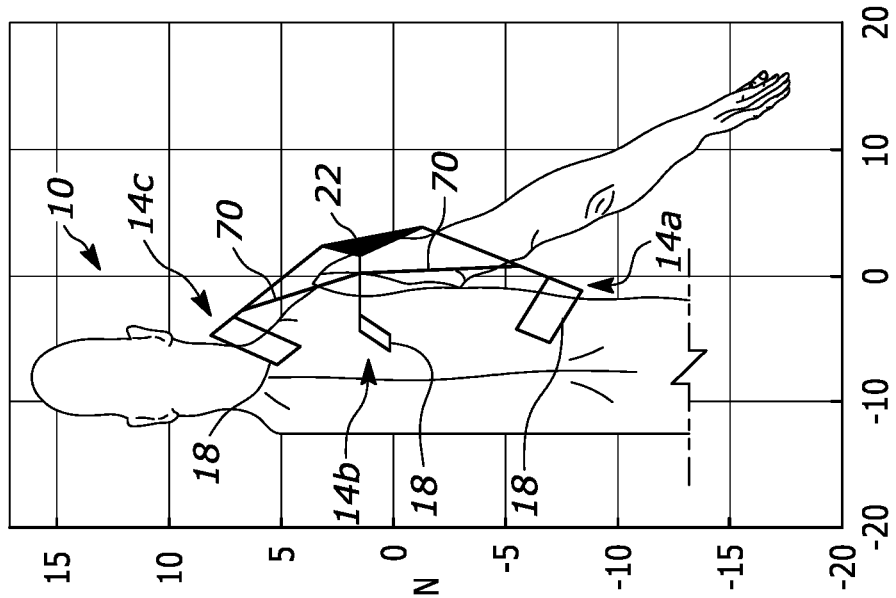
FIG. 10d is a back schematic view of the four-bar spherical parallel manipulators of FIG. 4, coupled to a user's shoulder.
Figure 10C:
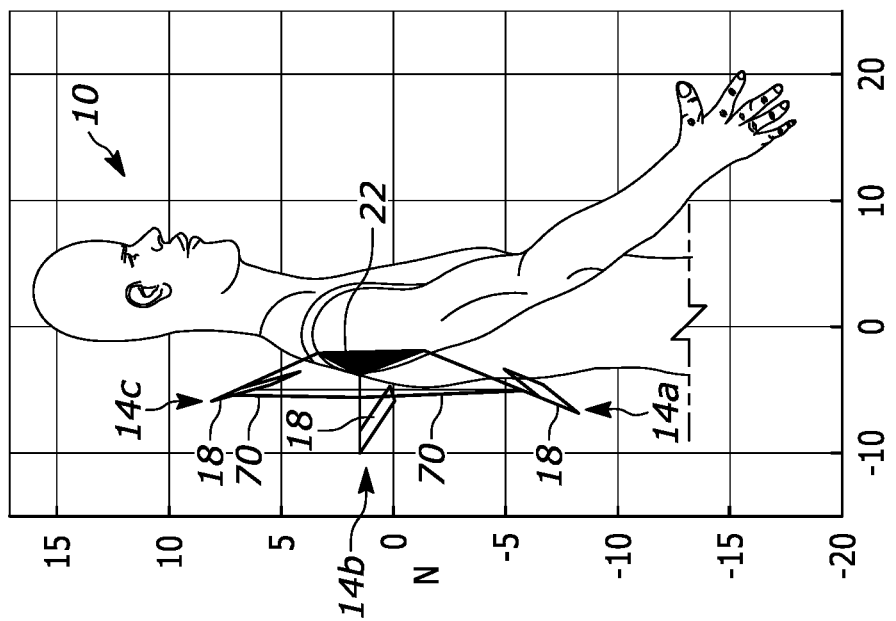
FIG. 10c is a side schematic view of the four-bar spherical parallel manipulators of FIG. 4, coupled to a user's shoulder.

FIGS. 10c-10d show an embodiment of the 4B-SPM 10 that includes the linkages 70. The linkages 70 may move along the outermost substructures positioned above and below the shoulder (e.g., the first substructure 14a and the third substructure 14c), for example via linearly actuated sliders like sliders 74 described above. In the illustrated embodiment, the linkages 70 are coupled to the second substructure 14b, positioned between the outermost substructures 14a, 14c. The linkages 70 are also coupled generally at the same point on the second substructure 14b, for example via a spherical joint or joints such as joints 82 described above.

Figure 11:
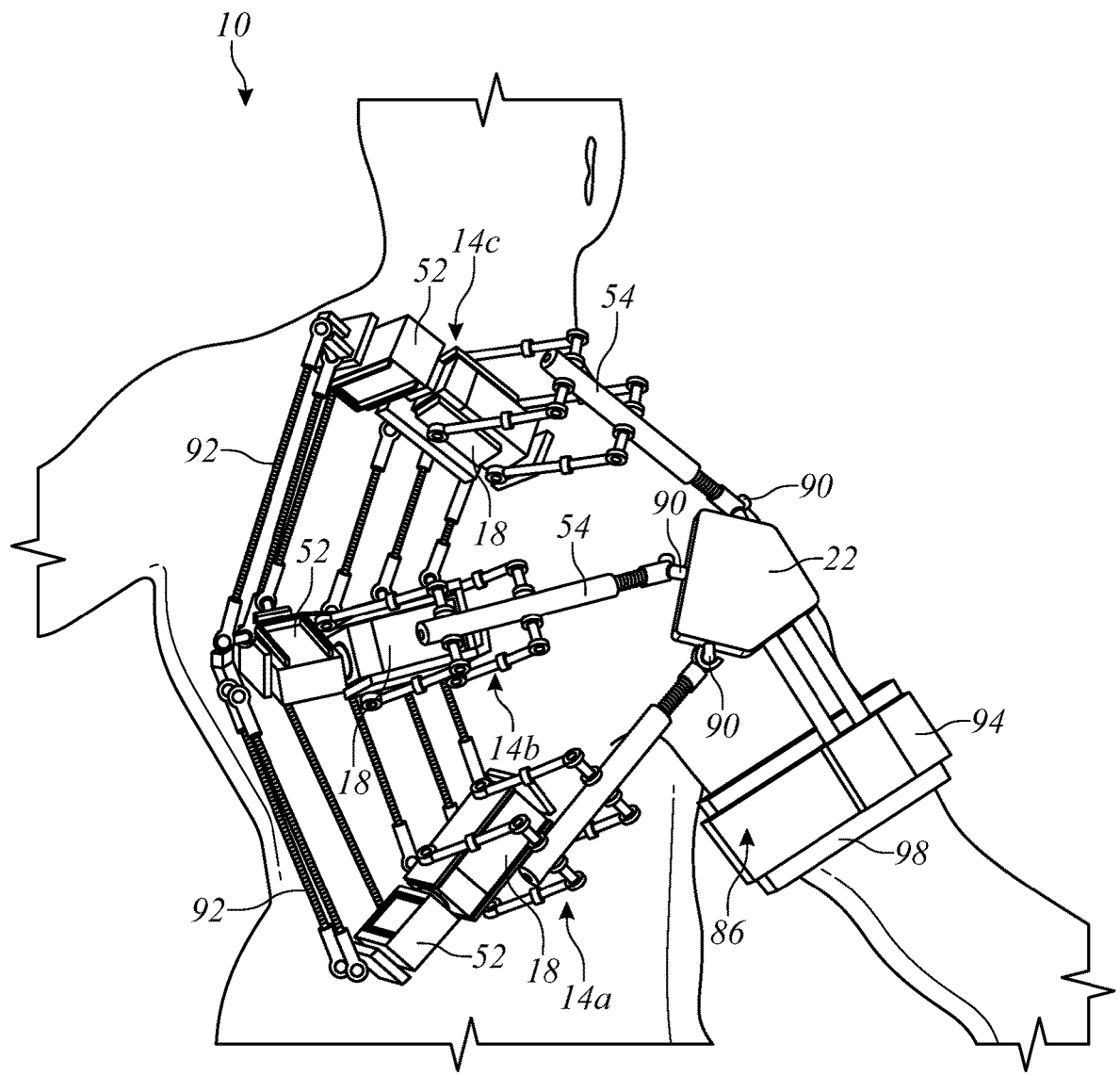
FIG. 11 is a perspective view of the four-bar spherical parallel manipulators of FIG. 1, coupled to a user's shoulder.
Figure 12A:
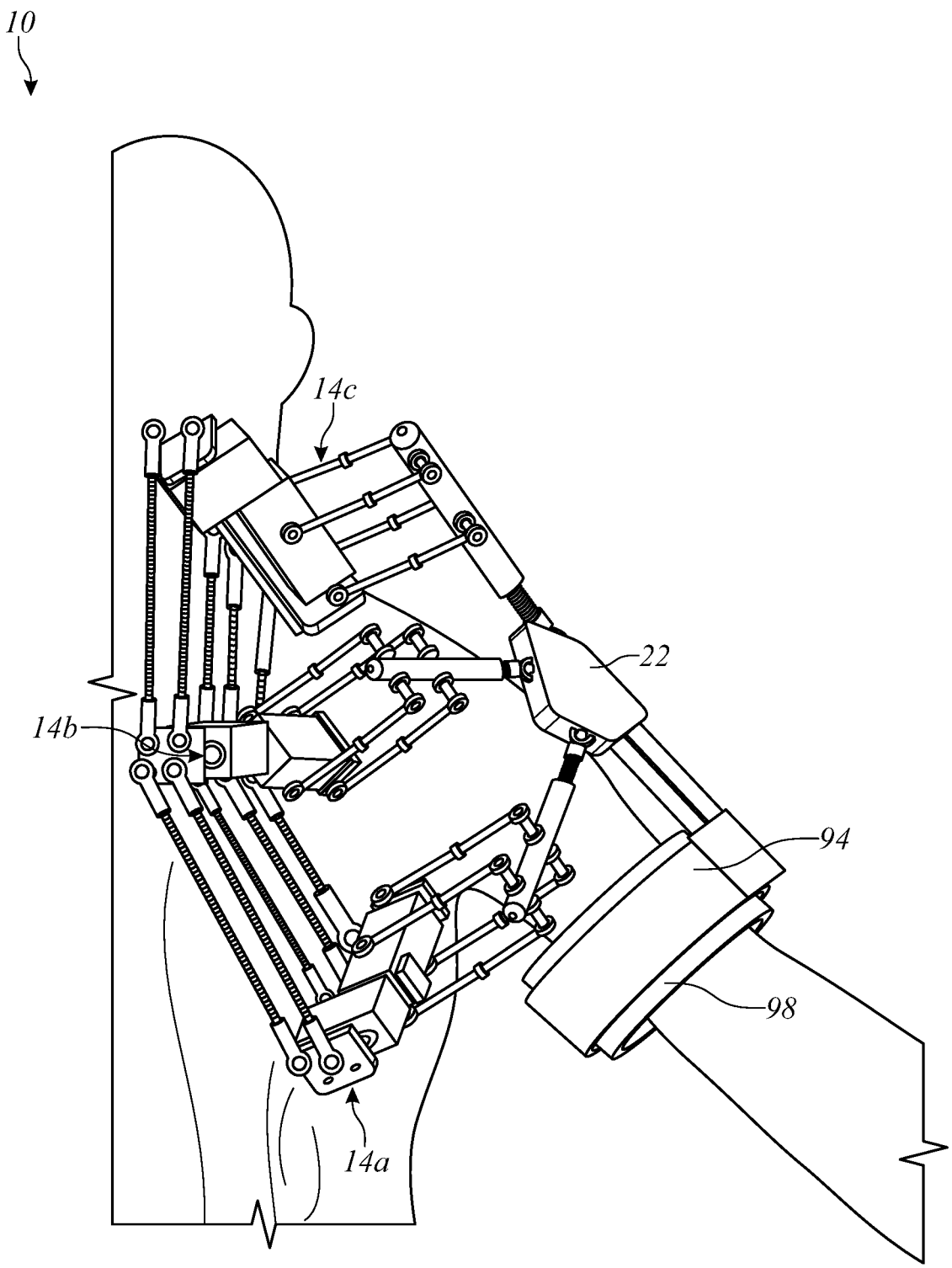
FIG. 12a is a back view of the four-bar spherical parallel manipulators of FIG. 1, coupled to a user's shoulder.
Figure 12C:
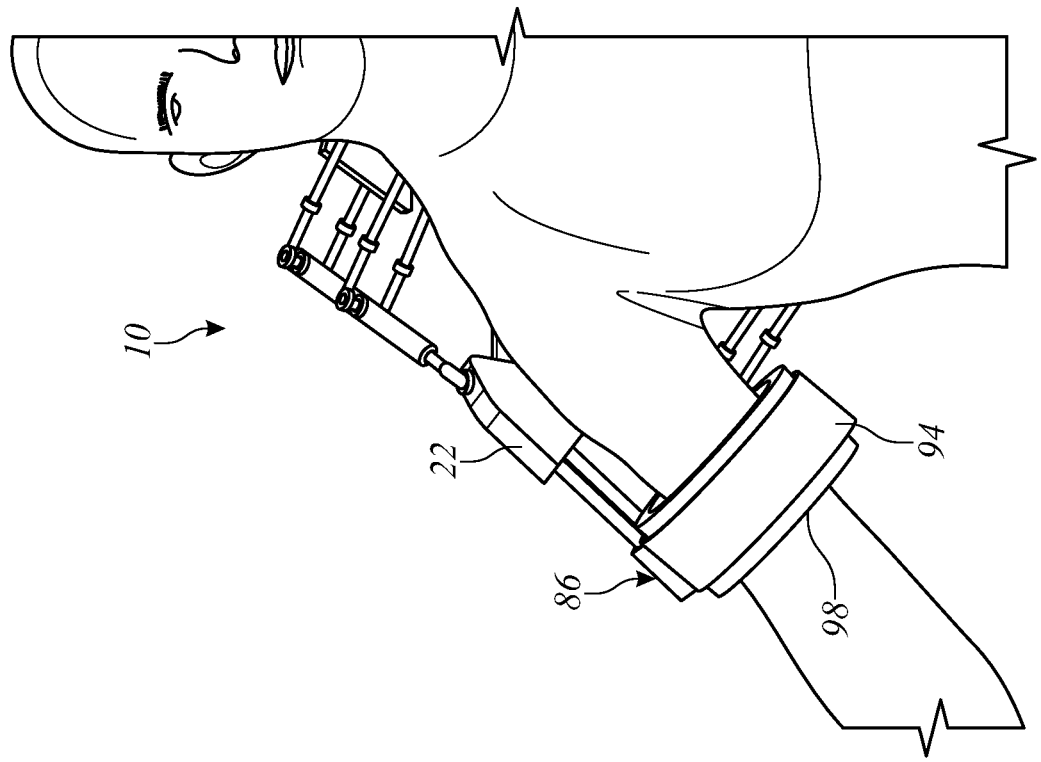
FIG. 12c is a front view of the four-bar spherical parallel manipulators of FIG. 1, coupled to a user's shoulder.
Figure 12B:
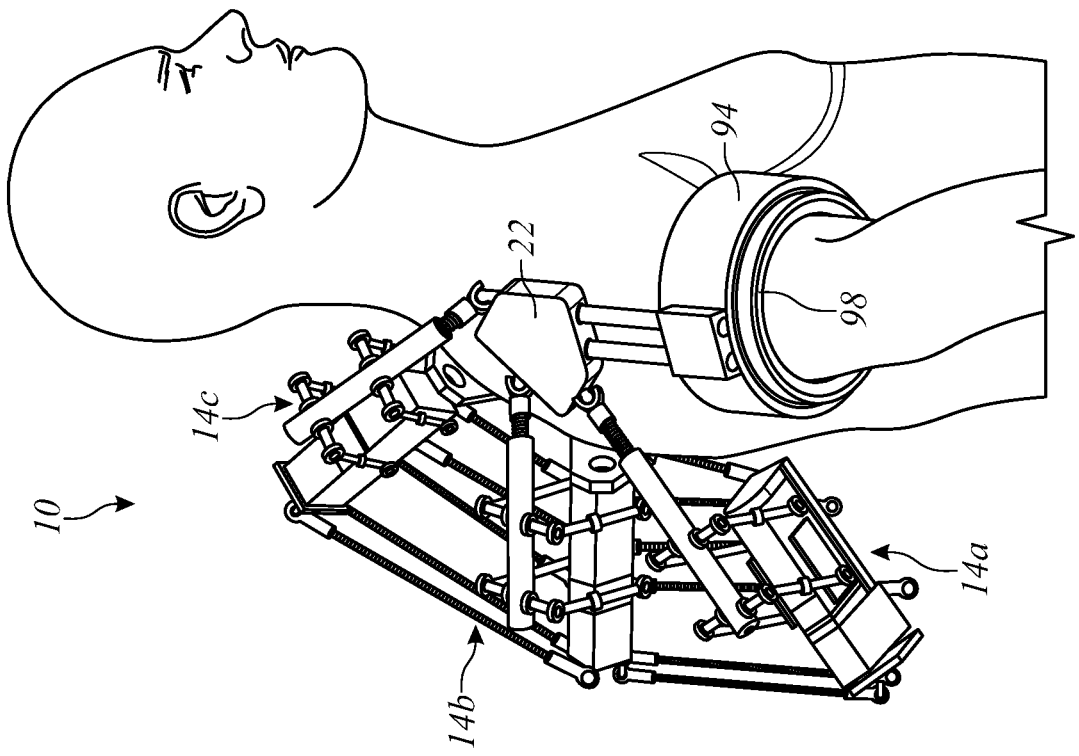
FIG. 12b is a side view of the four-bar spherical parallel manipulators of FIG. 1, coupled to a user's shoulder.

As shown in FIGS. 11-12c, the 4B-SPM 10 positioned as a shoulder exoskeleton may include three substructures 14, each for example with one or more motors 52. In some embodiments, one motor 52 may control the pitch of the four-bar mechanism 14, and the other motor 52 (see e.g., FIG. 3 showing two motors for each substructure) controls the roll of the four-bar mechanism 14. In the illustrated embodiment, each four-bar mechanism 14 is built using a combination of rod end bolts, threaded rods, ball bearings, and aluminum tubing (not shown). Other embodiments include different materials or combinations of materials than that illustrated. Each four-bar mechanism is coupled to a shoulder plate 22 with a type of spherical joint 62 (e.g., a ball joint rod end 90). In the illustrated embodiment, the shoulder plate 22 is also made from aluminum, although other embodiments include different materials. The position and orientation of each substructure is held fixed with respect to one another through the use of static (e.g., Stewart-Gough) platforms 92 built using threaded rod and ball joint rod ends, which allows for high stiffness and the ability to alter the substructure configuration.

To couple the shoulder plate 22 to the operator, a revolute joint interface 86 (e.g., a cuff) is positioned at the upper arm. A rotational DoF is added to the cuff 86, which allows the cooperative control technique to improve the effective workspace 66 (see e.g., FIG. 1). In the illustrated embodiment, the cuff 86 is constructed from two concentric tubes. The outer tube 94 is connected to the shoulder exoskeleton (e.g., the shoulder plate 22) and the inner tube 98 is positioned around the upper arm with a padded interface between operator and outer tube 94.

The cuff 86 also allows one translational DoF, which permits translational slip between the tubes 94, 98. The translational slip between the tubes 94, 98 prevents possible joint misalignment between the operator and 4B-SPM 10 from applying excessive force to the human shoulder joint, which can damage the shoulder joint.

An admittance control scheme that utilizes force feedback from the cuff 86 may be used to determine user commands in terms of position, and thereby operate the 4B-SPM 10. Commands from the user may be sent to the motors 52 using a motion controller (not shown). Force feedback may be measured using an array of piezo-resistive force sensors placed between the outer and inner tubes 94, 98 to capture both the magnitude and direction of a contact force vector. In the illustrated embodiment, the operating torques may be approximated to be between ~30 and ~60 Nm of output at the shoulder when six motors 52 are used (see e.g., FIG. 3). When only three motors 52 are used (see e.g., FIG. 1), approximated torque output is between ~0 and ~30 Nm. Other embodiments include different values and ranges of values.

The parallel actuated systems described herein may have several advantages over serial actuated systems. For example, the parallel actuated systems may use multiple parallel sets of links 42, 46, 54 in substructures 14a-14c working in parallel (i.e., at the same time) to achieve the desired motion. The parallel actuated systems may have short moment arms which reduce torque applied at a joint by external forces. The parallel actuated systems may also have a low center of mass which results in a low end effector inertia, which reduces energy costs during operation. Low end effector inertia also results in high end effector acceleration. The parallel actuated systems may have high potential stiffness because the 4B-SPM 10 has multiple mounting point locations on both the mobile platform 22 and the stationary base 18. Finally, the parallel actuated systems may not occupy a center of rotation (i.e., the parallel actuated system rotates about a point without occupying it), which may be important when interfacing with ball and socket joints (e.g., the shoulder, the hip, the wrist, and/or the ankle).

The parallel actuated systems may also have minimal positioning error because the parallel systems work to attenuate any errors, which allow lower tolerance sensors and components to be used without a significant impact on position accuracy. A six motor 52 4B-SPM 10 may be less expensive than comparable serial actuated exoskeletons, which require more expensive components (e.g., sensors) to increase accuracy.

The substructures 14 of the parallel actuated systems may be oriented in a variety of configurations, which may be advantageous when integrating the substructures 14 into a larger overall exoskeleton system (not shown). The exoskeleton system may have features or components that are already rigidly positioned and cannot be moved (e.g., a power source, controls, additional support structures, etc.). The substructures 14 may be positioned around the rigidly positioned components, and incorporated into the exoskeleton system.

The embodiment(s) described above and illustrated in the figures are presented by way of example only and are not intended as a limitation upon the concepts and principles of the present disclosure. As such, it will be appreciated that variations and modifications to the elements and their configuration and/or arrangement exist within the spirit and scope of one or more independent aspects as described.

What is claimed is:

1. An exoskeleton for interfacing with a joint, the exoskeleton comprising:
    a base configured to be coupled to a user;
    a platform configured to be coupled to the user proximate the joint;
    a plurality of substructures extending between the base and the platform, wherein the substructures are configured to be actuated in parallel to move the platform relative to the base; and
    linkages and linearly actuated sliders coupled to the linkages, wherein the linkages and linearly actuated sliders couple adjacent substructures of the plurality of substructures together, wherein the linkages and linearly actuated sliders are configured to control a roll angle of the exoskeleton.

2. The exoskeleton of claim 1, wherein each substructure of the plurality of substructures includes,
    a base link;
    a first link coupled to a first end of the base link;
    a second link coupled to a second end of the base link, the second link being parallel to the first link; and
    a top linkage coupled to the first link and the second link, wherein the top linkage extends to the platform.

3. The exoskeleton of claim 1, wherein the plurality of substructures includes two outer substructures and a center substructure positioned between the two outer substructures, wherein the linkages are coupled to the center substructure via spherical joints, and are moveable along the two outer substructures via the linearly actuated sliders.

4. The exoskeleton of claim 1, wherein the joint is a shoulder, wherein the exoskeleton further includes a cuff coupled to the platform and configured to be coupled to an arm of the user, the cuff including an outer tube and an inner tube moveable relative to the outer tube.

5. An exoskeleton for interacting with a ball and socket joint, the exoskeleton comprising:
    a base configured to be coupled to a user;
    a platform configured to be coupled to the user, the platform configured to move in a spherical workspace;
    a plurality of substructures connecting the base to the platform, wherein the plurality of substructures are configured to be actuated in parallel to move the platform relative to the base;
    wherein the plurality of substructures includes two outer substructures and a center substructure positioned between the two outer substructures, wherein the exoskeleton further comprises linearly actuated sliders connecting adjacent substructures, the linearly actuated sliders configured to control a roll angle of the exoskeleton, wherein the linearly actuated sliders are coupled to the center substructure via spherical joints, and are moveable along the two outer substructures via the linearly actuated sliders.

6. The exoskeleton of claim 5, wherein each of the plurality of substructure includes,
    a base link;
    a first link coupled to a first end of the base link;
    a second link coupled to a second end of the base link, the second link being parallel to the first link; and
    a top linkage coupled to the first link and the second link, the top linkage extending to the platform.

7. The exoskeleton of claim 6, further comprising a three degree-of-freedom joint connecting each top link to the platform.

8. The exoskeleton of claim 5, wherein a center of rotation of the platform is spaced apart from the platform.

9. The exoskeleton of claim 5, further comprising a motor coupled to each substructure.

10. An exoskeleton for interacting with a ball and socket joint, the exoskeleton comprising:
a base configured to be coupled to a user;
a platform configured to be coupled to the user proximate the ball and socket joint;
a first substructure connecting the base to the platform;
a second substructure connecting the base to the platform, the second substructure spaced apart from the first substructure;
a third substructure connecting the base to the platform, the third substructure spaced apart from the first and second substructures, wherein the first, second, and third substructures are configured to be actuated in parallel to move the platform about a spherical workspace;
wherein the substructures include two outer substructures and a center substructure positioned between the outer substructures, the exoskeleton further comprising linearly actuated sliders connecting adjacent substructures, the linearly actuated sliders configured to control a roll angle of the exoskeleton, the linearly actuated sliders are coupled to the center substructure via spherical joints, and moveable along the outer substructures via the linearly actuated sliders.

11. The exoskeleton of claim 10, wherein each substructure includes,
a base link;
a first link coupled to a first end of the base link;
a second link coupled to a second end of the base link, the second link being parallel to the first link; and
a top linkage coupled to the first link and the second link, the top linkage extending to the platform.

12. The exoskeleton of claim 10, wherein the platform is configured to move in a spherical workspace, and includes a center of rotation spaced apart from the platform.

13. The exoskeleton of claim 10, wherein each of the substructures includes a first motor configured to control the pitch of the respective substructure, and a second motor configured to control the roll of the respective substructure.

14. The exoskeleton of claim 10, wherein each substructure is coupled to the platform with a spherical joint.

15. An exoskeleton for interacting with a ball and socket joint, the exoskeleton comprising:
a base configured to be coupled to a user;
a platform configured to be coupled to the user proximate the ball and socket joint;
a first substructure connecting the base to the platform;
a second substructure connecting the base to the platform, the second substructure spaced apart from the first substructure;
a third substructure connecting the base to the platform, the third substructure spaced apart from the first and second substructures, wherein the first, second, and third substructures are configured to be actuated in parallel to move the platform about a spherical workspace;
wherein each of the substructures includes a first motor configured to control the pitch of the respective substructure, and a second motor configured to control the roll of the respective substructure.

* * * * *